United States Patent
Sataka

(10) Patent No.: US 8,352,098 B2
(45) Date of Patent: Jan. 8, 2013

(54) FLIGHT CONTROL SYSTEM AND METHOD OF SEPARATING CONTROL LEVER LINKAGE

(75) Inventor: Masahiko Sataka, Aichi (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 337 days.

(21) Appl. No.: 12/674,509

(22) PCT Filed: Jun. 25, 2008

(86) PCT No.: PCT/JP2008/061533
§ 371 (c)(1),
(2), (4) Date: Aug. 16, 2010

(87) PCT Pub. No.: WO2009/104288
PCT Pub. Date: Aug. 27, 2009

(65) Prior Publication Data
US 2010/0305780 A1  Dec. 2, 2010

(30) Foreign Application Priority Data
Feb. 20, 2008  (JP) .................. 2008-039342

(51) Int. Cl.
G05D 1/00 (2006.01)
G06F 7/00 (2006.01)
(52) U.S. Cl. .......................................... 701/3
(58) Field of Classification Search .................. 701/3, 8, 701/14; 224/75.1, 76 R, 229; 192/3.62, 192/99 R; 280/11.33; 368/192, 199
See application file for complete search history.

(56) References Cited

U.S. PATENT DOCUMENTS

| 3,949,958 A | 4/1976 | Richter |
| 5,456,428 A | 10/1995 | Hegg |
| 5,489,830 A * | 2/1996 | Fernandez .................. 318/628 |
| 5,782,436 A | 7/1998 | Pohling |
| 6,162,124 A * | 12/2000 | Hiraoka et al. ................. 463/38 |
| 8,052,097 B2 * | 11/2011 | Rollet ........................... 244/229 |

FOREIGN PATENT DOCUMENTS

| EP | 0 573 106 | 12/1993 |
| EP | 0 743 581 | 11/1996 |
| JP | 6-32291 | 2/1994 |
| JP | 8-310494 | 11/1996 |
| JP | 2000-335496 | 12/2000 |

OTHER PUBLICATIONS

International Search Report issued Aug. 12, 2008 in International (PCT) Application No. PCT/JP2008/061533.

* cited by examiner

Primary Examiner — Mary Cheung
(74) Attorney, Agent, or Firm — Wenderoth, Lind & Ponack, L.L.P.

(57) ABSTRACT

A flight control system according to the present invention includes a first sensor, a flight control computer, a link mechanism, a separation unit, and a second sensor detecting a force transmitted from the first control lever to the link mechanism. The first sensor detects a force applied from an outside to a first control lever. The flight control computer determines whether or not sticking arises in the first control lever on the basis of the force detected by the first sensor and the force detected by the second sensor, and outputs a separation command to the separation unit when determining that the sticking arises. The separation unit disconnects the link mechanism on the basis of the separation command to separate a connection between the first control lever and the second control lever.

20 Claims, 15 Drawing Sheets

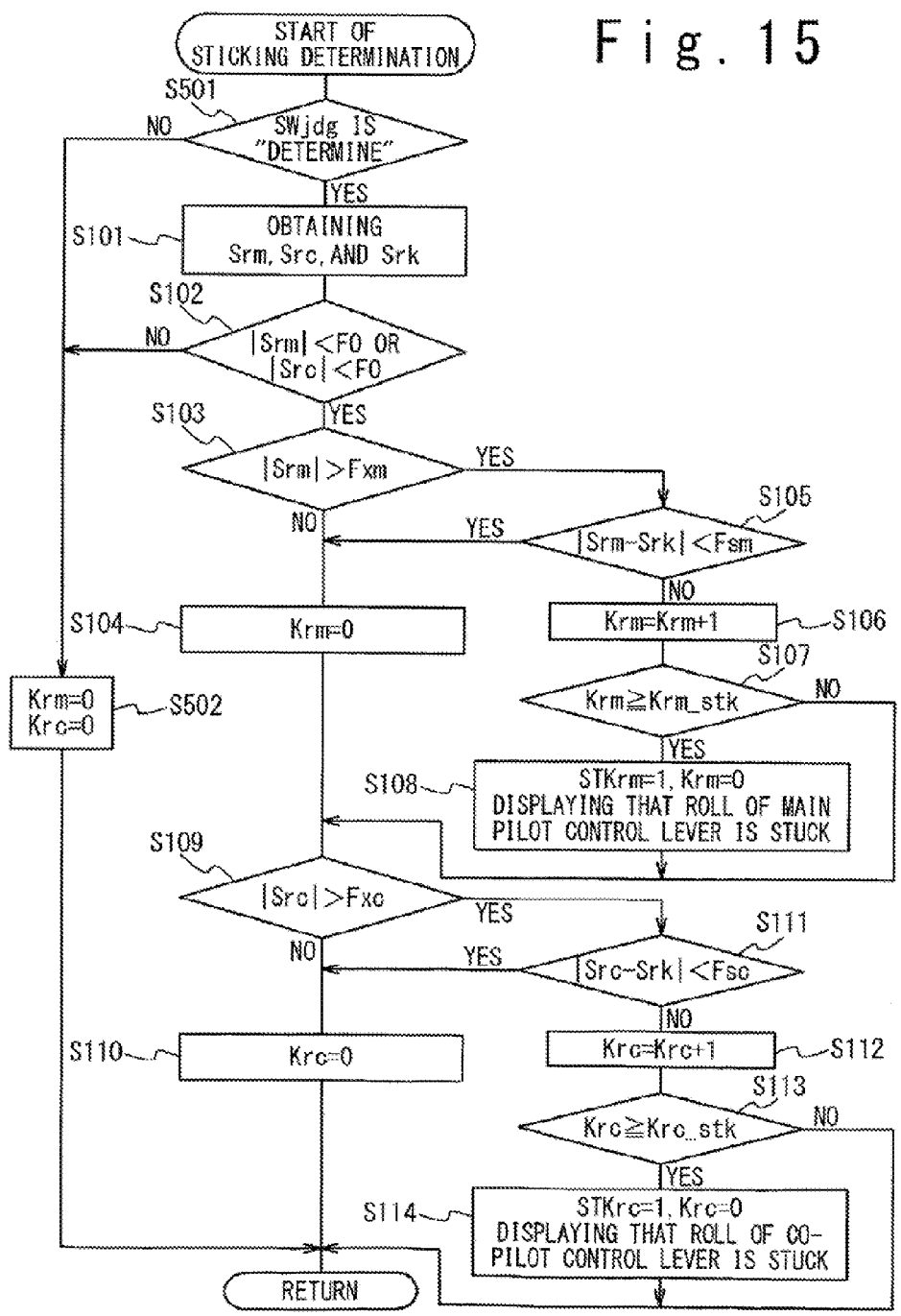

FLIGHT CONTROL SYSTEM AND METHOD OF SEPARATING CONTROL LEVER LINKAGE

TECHNICAL FIELD

The present invention relates to a flight control system and a method of separating control lever linkage where two control levers are linked with each other by a link mechanism. In addition, this application claims priority from Japanese Patent Application No. 2008-039342, and the disclosure of Japanese Patent Application No. 2008-039342 is incorporated herein in its entirety by reference.

BACKGROUND ART

A control lever includes a wheel and a column manipulated by a pilot. The pilot can execute an operating input of a rolling direction (a roll input) by rotating the wheel and an operating input of a pitching direction (a pitch input) by pushing and pulling the column. The roll input and the pitch input are converted into electric signals by displacement sensors of the wheel and column, and are inputted to a fight control computer as a pitch command and a roll command (collectively referred to as an operating command). A control law calculation is executed on the basis of this operating command in the flight control computer and control surfaces are driven by actuators which are controlled based on the calculation result, and thus a fuselage (for example, an aircraft) can be controlled. Japanese Laid-Open Patent Application JP-P 2000-335496A discloses a flight control system of an aircraft using a fly-by-wire described above.

In the flight control system using the control lever of the wheel and column, the control levers on a pilot side and on a co-pilot side, generally, are mechanically linked and the flight control can be carried out if the input is executed from either one of the control levers. Since a force (an operating input) applied to one of the control levers is transmitted to the other of the control levers by a link mechanism, the two control levers move with being interlocked.

It is assumed that the above described control levers are stuck in a movable portion. When the control levers are stuck, it becomes impossible to carry out the flight control and there is a possibility to lead to a fuselage loss.

In order to avoid the above mentioned uncontrollable state caused by the sticking, a conventional technique includes a mechanism (a separation mechanism) for releasing the mechanical linkage (the link mechanism) between both of the control levers in some way.

As a related technique, there is a flight control system (for example, U.S. Pat. No. 5,782,436) including a mechanism for avoiding the jamming by generating a slip when a force equal to or more than a predetermined value is applied from the control lever to the link mechanism. In this case, even when one of the control levers is jammed, the flight control can be carried out by applying a force equal to or more than the predetermined value to the other non-jammed control lever. However, since a jammed portion is not clear in such a technique, it is required to apply a large force to both of the control levers to specify the operable control lever. In addition, since it is required to generate the slip by applying the force equal to or more than a predetermined value in order to avoid the jamming, a pilot needs to constantly input a large operating force. Furthermore, the technique for avoiding the jamming by using the slip sometimes generates the slip depending on some conditions even in a case other than the jamming. On this occasion, negative effects, such as a false detection of a sensor signal from the control lever and a fighting between systems each of which is connected to both control levers, may sometimes occur.

For this reason, a technique for separating a control lever which is stuck from a non-troubled control lever is demanded.

On the other hand, U.S. Pat. No. 5,456,428 discloses a flight control system for carrying out, when the fly-by-wire is out of order, mechanical backing up by engagement using a clutch.

DISCLOSURE OF INVENTION

Accordingly, an object of the present invention is to provide a flight control system and a method of separating control lever linkage which separate a control lever which is stuck from a link mechanism of the control levers.

A flight control system according to the present invention includes a first sensor, a flight control computer, a link mechanism, a separation unit, and a second sensor. The first sensor detects a force applied from an outside to a first control lever. The second sensor detects a force transmitted from the first control lever to the link mechanism. The flight control computer includes a sticking determination portion which determines whether or not sticking arises in the first control lever on the basis of the force detected by the first sensor and the force detected by the second sensor. The sticking determination portion outputs a separation command to the separation unit when determining that the sticking arises in the first control lever. The link mechanism mechanically connects the first control lever to the second control lever and transmits, to the second control lever, a force from the first control lever. The separation unit disconnects the link mechanism on the basis of the separation command to separate a connection between the first control lever and the second control lever. According to this, detection of occurrence of the sticking in the control lever, specifying of the stuck control lever, and separation of the stuck control lever are possible.

A method of separating a control lever linkage according to the present invention is a method of separating a link mechanism which mechanically connects a first control lever to a second control lever different from the first control lever and transmits a force from the first control lever to the second control lever. The method of separating a control lever linkage according to the present invention includes: a step of a first sensor detecting a force applied from an outside to the first control lever; a step of a second sensor detecting a force transmitted from the first control lever to the link mechanism; a step of determining whether or not sticking arises in the first control lever on the basis of the force detected by the first sensor and the force detected by the second sensor; a step of outputting a separation command when determining that the sticking arises in the first control lever in the step of the sticking determination; and a step of disconnecting the link mechanism on the basis of the separation command to separate a connection between the first control lever and the second control lever.

As described above, the flight control system and the method of separating the control lever linkage according to the present invention can separate the stuck control lever from the link mechanism of the control levers.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 15 is a flowchart showing an operation of a sticking determination processing in the fifth embodiment according to the present invention.

BEST MODE FOR CARRYING OUT THE INVENTION

Figure 1:
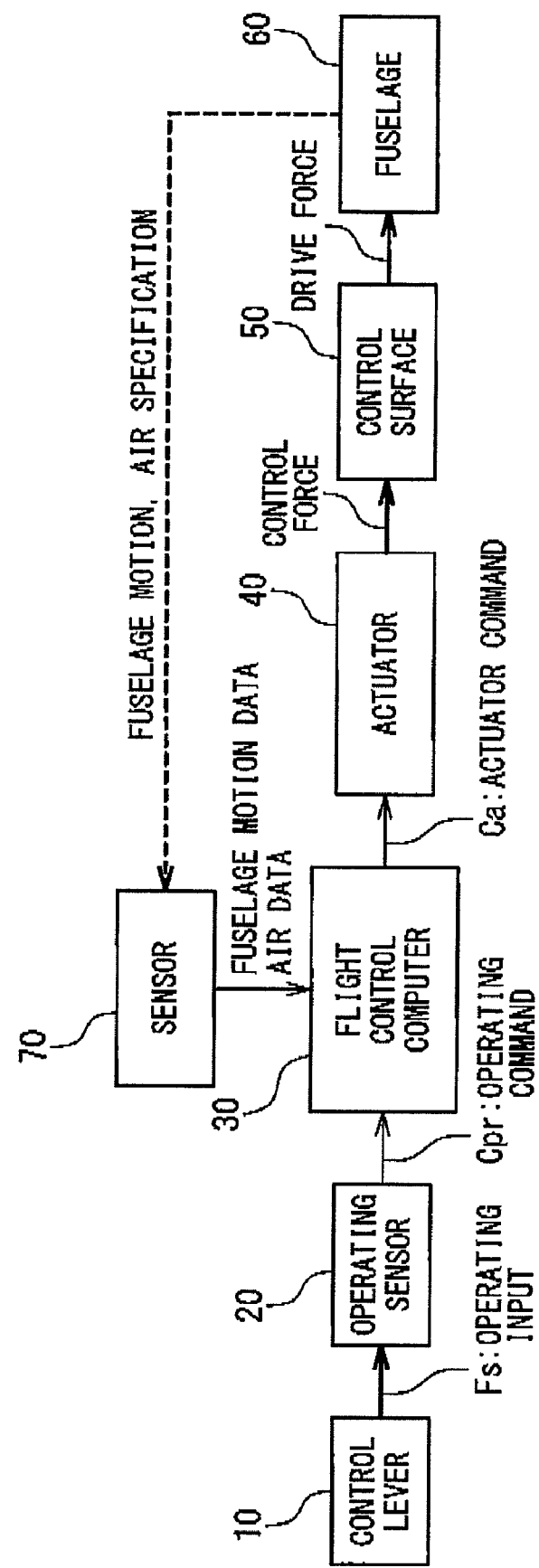
FIG. 1 is a block diagram showing a configuration of an aircraft in embodiments according to the present invention.

Hereinafter, referring to attached drawings, embodiments of a flight control system and a method of separating a control lever linkage according to the present invention will be explained. Identical or similar reference letters in the drawings show identical, similar, or equivalent components or processing.

First Embodiment

In the present embodiment, an example of a flight control system provided to an aircraft employing a fly-by-wire will be explained. The fly-by-wire is a method for converting pilot operating into electric signals and inputting the signals to an electric-hydraulic servo actuator to electrically operate. FIG. 1 is a view showing a configuration of an aircraft according to the present invention. Referring to FIG. 1, a detailed operation of controlling the aircraft employing the fly-by-wire will be explained. An operating input Fs to a control lever 10 is converted into an electric signal (an operating command Cpr) by an operating sensor 20 and is inputted to a flight control computer 30. A fuselage motion such as an acceleration of a fuselage 60 and air specification such as a barometric altitude are detected by a sensor 70 and are inputted to the flight control computer 30 as fuselage motion data and as air data. The flight control computer 30 outputs an actuator command Ca on the basis of the operating command Cpr, the fuselage motion data, and the air data. The actuator 40 controls a control surface 50 on the basis of the actuator command Ca to control a motion of the fuselage 60. As described above, in the aircraft employing the fly-by-wire, the motion of the aircraft is controlled by using the flight control computer 30.

Figure 2:
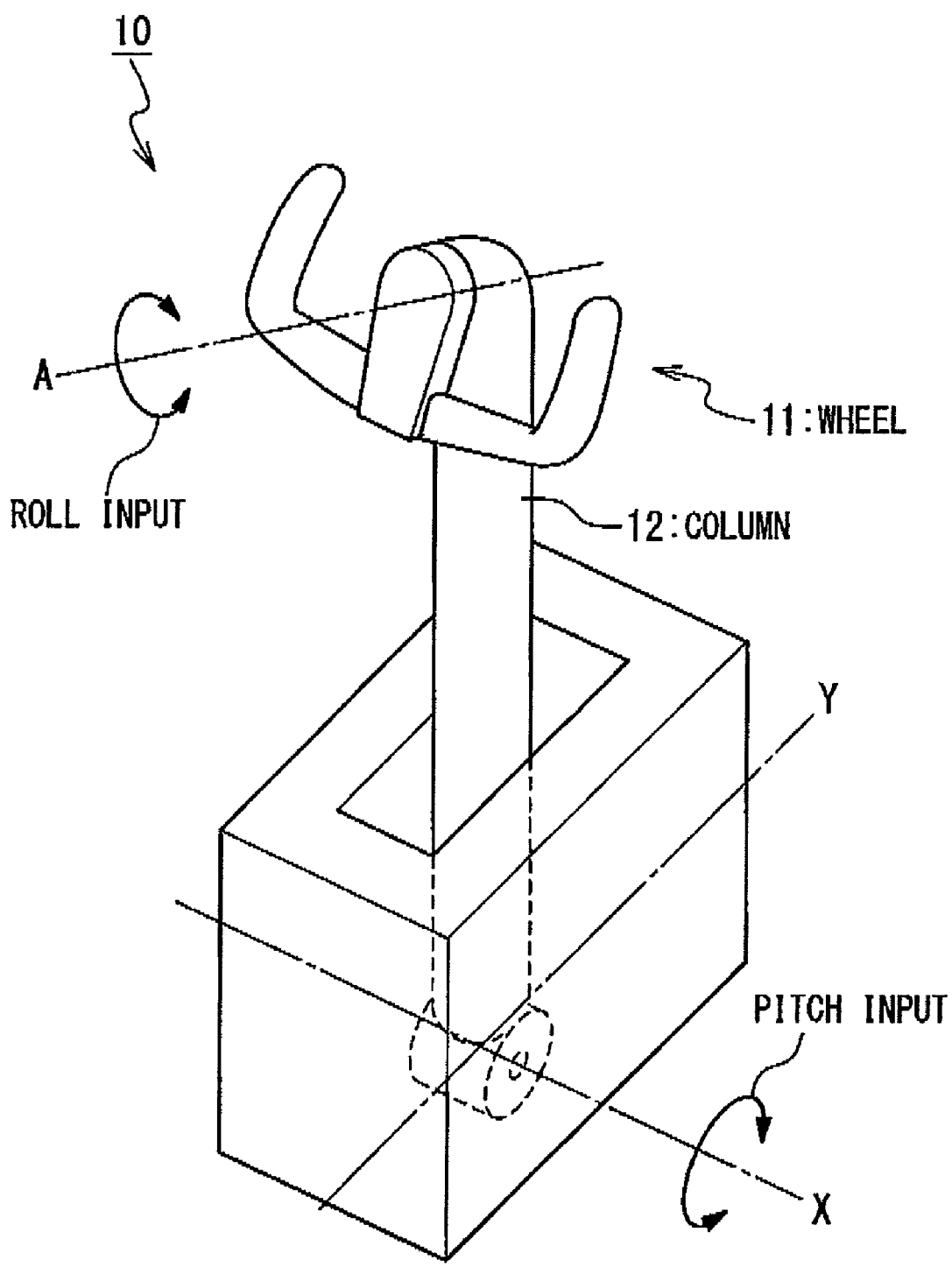
FIG. 2 is a pattern diagram of a control lever according to the present invention.

FIG. 2 is a pattern diagram of the control lever 10 in the present embodiment. As shown in FIG. 2, the control lever 10 includes a wheel 11 and a column 12. The wheel 11 is connected to the column 12 and rotates within a predetermined angle, for example, around an A axis. A force transfer shaft (not shown in the figure) in the column 12 rotates within a predetermined angle with coordinating to the rotation of the wheel 11. The column 12 rotates around an X axis within a predetermined angle at a portion connecting to a main body of the fuselage. A pilot can input an operating force in a rolling direction via the force transfer shaft in the column 12 by rotating the wheel (a roll input). In addition, the pilot can input an operating force in a pitch direction by pushing and pulling the wheel 11 in a Y axis direction to rotate the column (a pitch input).

Figure 3:
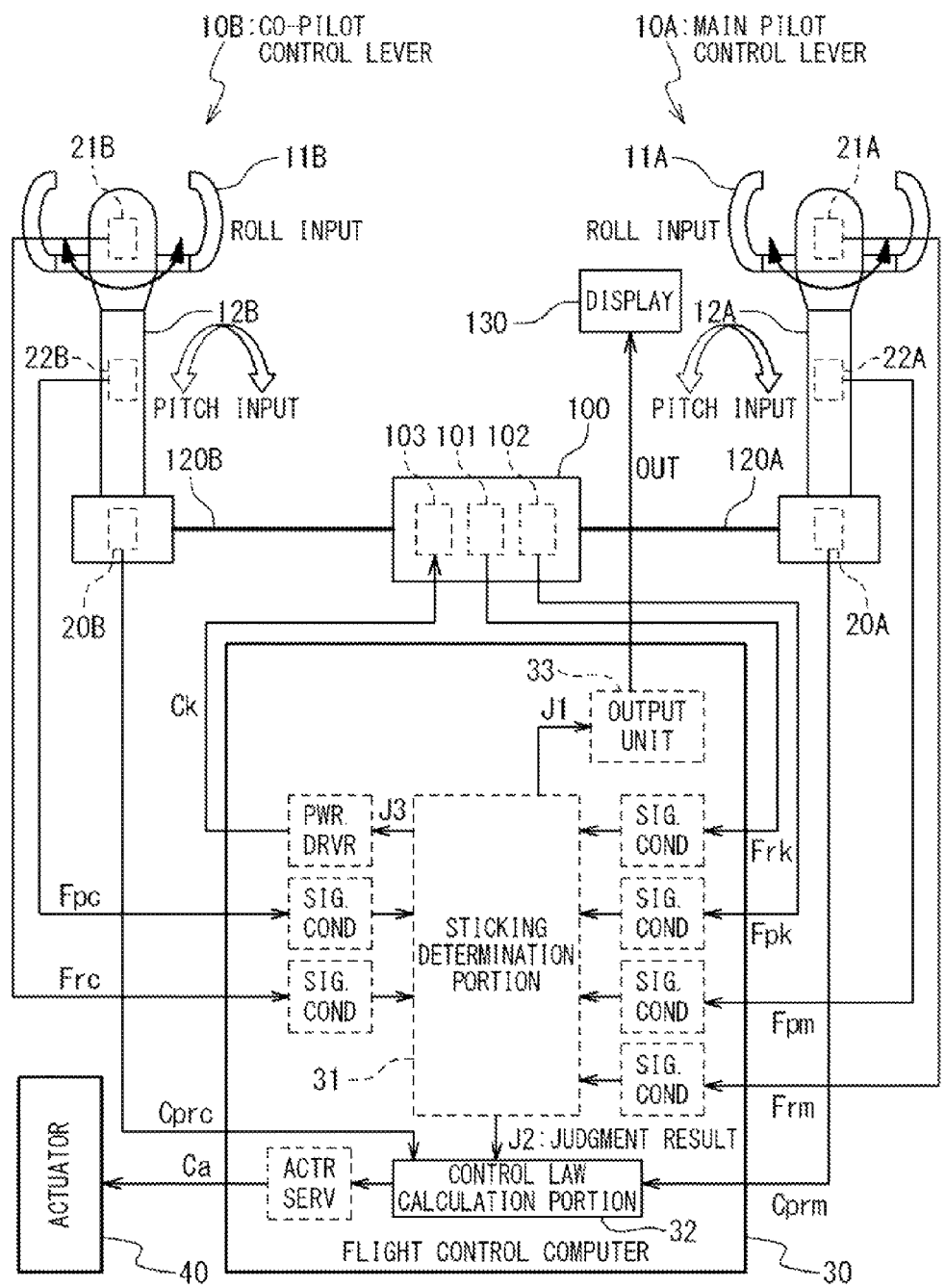
FIG. 3 is a view showing a configuration of a flight control system in a first embodiment according to the present invention.

FIG. 3 is a view showing a configuration of the flight control system in the first embodiment according to the present invention. Referring to FIG. 3, a configuration of the flight control system in the first embodiment will be explained. Following explanations will be made with adding "A" or "m" to reference letters of components for a main pilot side and adding "B" or "c" to reference letters of components for a co-pilot side.

The flight system in the first embodiment includes a main pilot control lever 10A, a co-pilot control lever 10B, a separation unit 100, a display 130, a flight control computer 30, and an actuator 40. The main pilot control lever 10A and the co-pilot control lever 10B are mechanically connected with each other via link mechanisms 120A and 120B. For this reason, an operating force (the roll input) in a roll direction and operating force (the pitch input) in a pitch direction applied to one of the control levers 10A and 10B are transmitted to the other one of the control levers 10A and 10B via the other link mechanism 120A or 120B.

The main pilot control lever 10A includes an operating sensor 20A, a roll sensor 21A, and a pitch sensor 22A. The operating sensor 20A detects displacements of the wheel 11A in the roll direction and of the column 12A in the pitch direction to convert the detected displacements into electric signals, and outputs the signals to the flight control computer 30 as operating commands Cprm. The roll sensor 21A and the pitch sensor 22A are attached to portions in which an operating force of the pilot is transmitted to the main pilot control lever 10A. The roll sensor 21A detects an operating force in the roll direction (the roll input) applied to the wheel 11A to convert the detected force into an electric signal, and outputs the electric signal to the flight control computer 30 as a roll input signal Frm. The pitch sensor 22A detects an operating force in the pitch direction (the pitch input) applied to the column 12A to convert the detected force into an electric signal, and outputs the signal to the flight control computer 30 as a pitch input signal Fpm. On this occasion, there must not be a portion having a possibility of the sticking between a portion to which the pilot applies an operating force and a portion to which the roll sensor 21A and the pitch sensor 22A are attached. As the roll sensor 21A and the pitch sensor 22A, various sensors, for example, a strain gauge, a capacitive sensor, a semiconductor sensor, and a piezoelectric sensor can be preferably used.

A configuration of the co-pilot control lever 10B is the same as that of the main pilot control lever 10A. Meanwhile, a roll sensor 21B detects an operating force in the roll direction applied to a wheel 11B to converts the detected force into an electric signal, and output the signal to the flight control computer 30 as the roll input signal Frc. In addition, a pitch sensor 22B detects an operating force in the pitch direction applied to a column 12B to convert the detected force into an electric signal, and outputs the signal to the flight control computer 30 as the pitch input signal Fpc.

The separation unit 100 disconnects a connection between the link mechanism 120A and the link mechanism 120B based on control by the flight control computer 30. Specifically, the separation unit 100 includes a roll sensor 101, a pitch sensor 102, and a separation mechanism 103. The roll sensor 101 detects a roll input transmitted via the link mechanisms 120A and 120B to convert the detected input into an electric signal, and outputs the signal to the flight control computer 30 as the roll input signal Frk. The pitch sensor 102 detects the pitch input transmitted via the link mechanisms 120A and 120B to convert the detected input into an electric signal, and outputs the signal to the flight control computer 30 as the pitch input signal Fpk. It is preferred that the roll sensor 101 and the pitch sensor 102 are provided to portions to which the roll input and the pitch input are transmitted in the link mechanisms 120A and 120B. It is preferred that the separation mechanism 103 is provided to a portion where the link mechanism 120A and the link mechanism 120B are connected with each other. The separation mechanism 103 disconnects the mechanical connection between the link mechanism 120A and the link mechanism 120B on the basis of the separation command Ck outputted from the flight control computer 30. On this occasion, it is preferred that the separation mechanism 103 cuts the transmission of the roll input and the pitch input. As the separation mechanism 103, for example, an electromagnetic clutch mechanism is preferably used in a portion transmitting the roll input and a hydraulic damper mechanism is preferably used in a portion transmitting the pitch input.

Signals outputted from all of the above mentioned sensors (the operating sensors 20A and 20B, the roll sensors 21A, 21B, and 101, and the pitch sensors 22A, 22B, and 102) are converted into digital signals by a signal conditioner (SIG. COND), and are inputted to a sticking determination portion 31 in the flight control computer 30.

The flight control computer 30 includes the sticking determination portion 31, a control law calculation portion 32, and an output unit 33. The sticking determination portion 31 determines whether or not the sticking arises in the control lever on the basis of the operating force applied to the control lever and of a force transmitted from the control lever to the link mechanism. Specifically, on the basis of the roll input signals Frm, Frc, Frk or the pitch input signals Fpm, Fpc, Fpk, the sticking determination portion 31 determines the occurrence of the sticking (detection of the sticking) and specifies the control lever where the sticking occurs, and outputs it as a determination result. The outputted determination result includes a determination result J1 outputted to the output unit 33, a determination result J2 outputted to the control law calculation portion 32, and a determination result J3 outputted to a power driver (PWR. DRVR).

The determination result J1 includes information indicating an existence or a non-existence of the sticking, information specifying the control lever where the sticking arises, and the like. The output unit 33 converts the determination result J1 into a display signal OUT and outputs the signal to the display 130. The display 130 displays the determination result of the sticking on the basis of the display signal OUT to be visible. For example, the display 130 is a lamp related to each control lever for notifying the existence or the non-existence of the sticking, and notifies the pilot of the sticking by lightning the lamp. Alternatively, the display 130 is a monitor device and displays information showing the existence or the non-existence of the sticking and the control lever where the sticking arises. In addition, an audio device may be provided which outputs sounds to notify the existence or the non-existence of the sticking and the control lever where the sticking arises on the basis of the determination result J1 in place of the display 130. In this case, the output unit 33 converts the determination result J1 into an audio signal corresponding to its content, and outputs the signal to the audio device. Moreover, the flight control system may include both of the display 130 and the audio device notifying the determination result. If an output device (the display 130 and/or the audio device) notifying the existence or the non-existence of the sticking is provided, the pilot can easily confirm the occurrence of the sticking. However, in the flight control system according to the present invention, since the control lever where the sticking arises is separated from the link mechanism and is not used for operating as described below, the control lever able to be operated can be specified without using the display 130. For this reason, installation of the display 130 may be omitted to reduce weights and costs of the aircraft. In this case, however, the pilot sometimes cannot determine whether or not a cause of being out of operating is because of the sticking.

The determination result J2 includes information indicating the existence or the non-existence of the sticking, information specifying the control lever where the sticking arises, and the like. When both of the control levers 10A and 10B are not stuck, the control law calculation portion 32 generally executes calculation on the basis of the fuselage motion data and air data inputted from the sensor 70 and of the operating command Cpr inputted from the operating sensor 20A or the operating sensor 20B, and outputs a calculation result to an actuator servo control device (ACTR. SERV). The actuator servo control device outputs the actuator command Ca corresponding to the calculation result to the actuator 40. When the sticking arises in one of the control levers 10A and 10B, that is, the determination result J2 indicating the occurrence of the sticking is outputted from the sticking determination portion 31, the control law calculation portion 32 specifies the control lever 10 where the sticking arises with reference to the determination result J2. Then, the control law calculation portion 32 prohibits using or inputting of the operating command Cpr from the control lever 10 where the sticking arises, and executes calculation for controlling the actuators by using the operating command Cpr from the other control lever 10. For example, when the sticking arises in the main pilot control lever 10A, the control law calculation portion 32 prohibits using of the operating command 20A and executes calculation for controlling the actuators by using the operating command 20B. According to this, the stuck control lever is prevented from controlling the control surfaces.

The determination result J3 includes information indicating the existence or the non-existence of the sticking. When the sticking determination information J3 indicates the existence of the sticking, the power driver (PWR. DRVR) outputs the separation command Ck for controlling the separation mechanism 103 to separate the link mechanism to the separation mechanism 103. The separation mechanism 103 disconnects the mechanical connection between the link mechanism 120A and the link mechanism 120B in response to the separation command Ck so as to cut the transmission of the roll input and the pitch input. According to this, the mechanical linkage between the main pilot control lever 10A and the co-pilot control lever 10B is disconnected and a resistance force generated by the sticking can be prevented from being transmitted to the non-stuck control lever 10.

Here, it is preferred that the sticking determination portion 31 and the control law calculation portion 32 are realized by a processing device, which is not shown in the figure, executing programs stored in a storage device, which is not shown in the figure.

Figure 4:
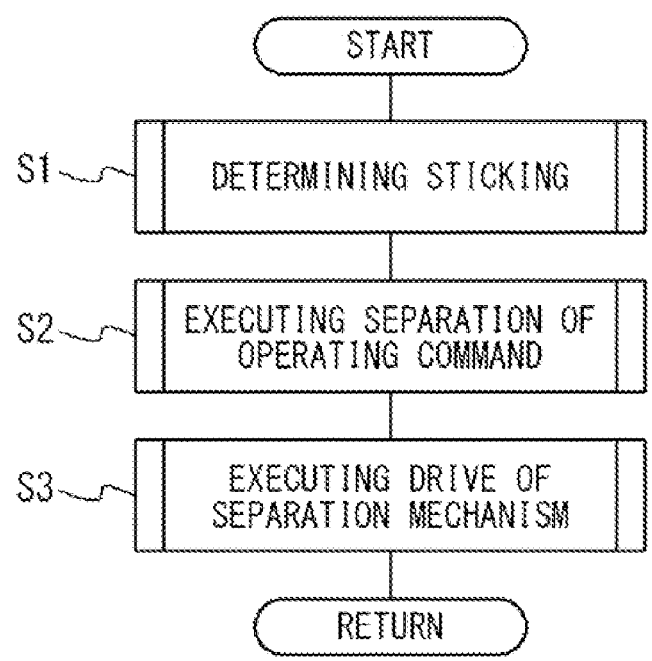
FIG. 4 is a flowchart showing an entire linkage separating operation in a flight control computer according to the present invention.

Referring to FIGS. 4 to 7, a linkage separating operation of the flight control system in the first embodiment according to the present invention will be explained. FIG. 4 is a flowchart showing an entire linkage separating operation of the flight control computer 30. As shown in FIG. 4, the sticking determination portion 31 according to the present invention determines the sticking on the basis of the forces detected by the sensors (the operating sensors 20A and 20B, the roll sensors 21A, 21B, and 101, the pitch sensors 22A, 22B, and 102) in the control lever 10 and the separation unit 100 (step S1). Next, the sticking determination portion 31 executes separation processing of the operating command on the basis of the sticking determination result at the step S1 (step S2). Here, the sticking determination portion 31 determines whether or not to separate the input of the operating command Cpr (the operating command Cprm or an operating command Cprc) to the control law calculation portion 32 on the basis of the sticking determination result. In addition, the sticking determination portion 31 executes drive processing of the separation mechanism on the basis of the sticking determination result at the step S1 (step S3). Here, the sticking determination portion 31 determines whether or not to drive the separation mechanism 103, namely, whether or not to separate the link mechanism 120A from the link mechanism 120B. The order of the processing at the step S2 and the step S3 is not limited to the order shown in FIG. 4, and these steps may be executed reversely or simultaneously.

Figure 5:
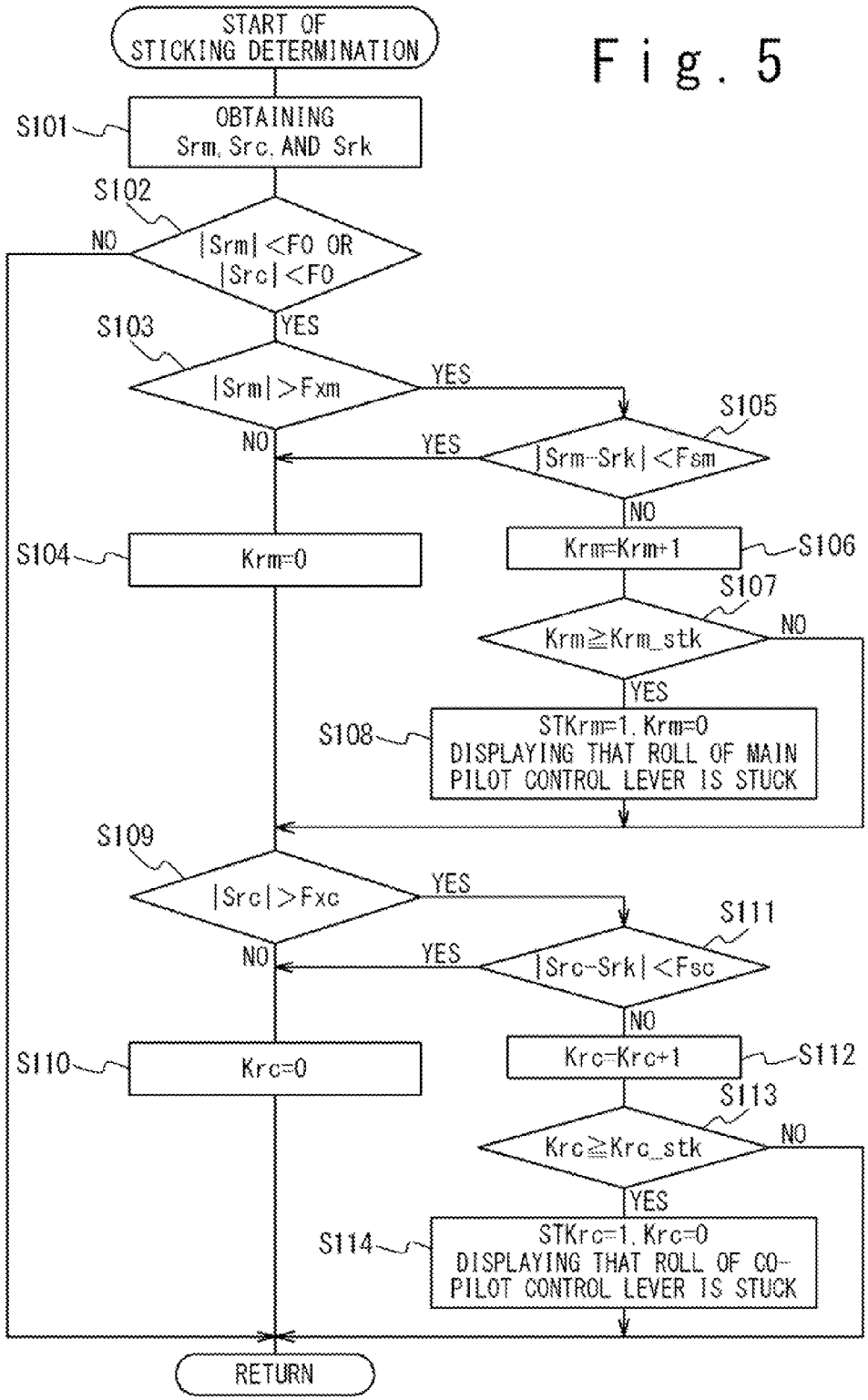
FIG. 5 is a flowchart showing an operation of a sticking determination processing in the first embodiment according to the present invention.

FIG. 5 is a flowchart showing the sticking determining operation of the step S1 in the first embodiment. Referring to FIG. 5, details of the sticking determining operation in the first embodiment will be explained. In a following description, the sticking determining operation will be explained taking a sticking determination for the roll input as an example, and an explanation of a sticking determination for the pitch input will be omitted because it is also the same as that of the roll input.

The sticking determination portion 31 receives the inputted roll signals Frm, Frc, and Frk at the predetermined timing, and obtains Srm, Src, and Srk corresponding to the roll signals Frm, Frc, and Frk (step S101). Here, the Srm, Src, and Srk show forces detected by the roll sensors 20A, 20B, and 101, respectively.

Next, the sticking determination portion 31 determines whether or not either one of the respective magnitudes of the Srm and the Src (absolute values of the Srm and the Src) is smaller than F0 of a predetermined reference value (step S102). The F0 is the reference value used for determining that an operating force is not applied from an outside to the control lever 10. For this reason, in a case where an operating force of the reference value F0 or more is not applied to either one of the main pilot control lever 10A and the co-pilot control lever 10B, the processing proceeds to the step S103 (Yes at the step S102), and in other cases, the processing proceeds to the step S101 (No as step S102).

In the processing at the step S103, the sticking determination portion 31 determines whether or not the magnitude of the Srm (the absolute value of the Srm) is larger than a predetermined reference value Fxm. The Fxm is the reference value used for determining a magnitude of an operating force applied to the main pilot control lever 10A. When the absolute value of the Srm is equal to or less than the Fxm, that is, a force larger than the Fxm is not applied to the main pilot control lever 10A, the sticking determination portion 31 sets Krm of a counter value to be 0 (No at the step S103, and then the step S104). Here, the Krm is the counter value used for determining the sticking in the roll input system on the main pilot control lever 10A side. As mentioned in a following description, the Krm is a barometer showing a possibility of the sticking, and when the magnitude of the Krm is large, the possibility of the sticking can be determined to be high. In addition, when the Krm is equal to or more than Krm_stk of a reference value, the sticking determination portion 31 determines that the sticking has occurred in the roll input system on the main pilot control lever 10A side.

In the processing at the step S103, when the absolute value of the Srm is larger than the Fxm, the sticking determination portion 31 determines whether or not a magnitude of a difference between the Srm and the Srk (an absolute value of (Srm−Srk)) is smaller than Fsm of a predetermined reference value (step S105). The Fsm is the reference value used for determining whether or not an operating force applied to the main pilot control lever 10A is transmitted to the link mechanisms 120A and 120B. When the absolute value of (Srm−Srk) is smaller than the Fsm, the sticking determination portion 31 sets the Krm of a counter value to be 0 (Yes at the step S105, and then the step S104). That is, when a force (a lost amount), which is lost from a force applied to the wheel 11A during being transmitted to the link mechanism 120A, is smaller than the reference value, the possibility of the sticking is determined to be low. On the other hand, when the absolute value of (Srm−Srk) is equal to or more than the Fsm, the sticking determination portion 31 adds 1 to the Krm of the counter value (No at the step S105, and then the step S106). That is, when a difference (a lost amount of force) between the force applied to the wheel 11A and the force transmitted through the link mechanism 120A is equal to or more than the predetermined reference value, the possibility of the sticking is determined to be high. As described above, in the processing at the step S105, the magnitude of the force, which is transmitted to the link mechanism 120A of the operating force Srm in the roll direction applied to the main pilot control lever 10A, is verified.

At the step S106, upon incrementing the Krm of the counter value, the sticking determination portion 31 determines whether or not the Krm is equal to or more than the Krm_stk of the reference value (step S107). The Krm_stk is the reference value used for determining the sticking. When the Krm is smaller than the Krm_stk, the processing proceeds to next processing (processing at the step S109) with keeping the value of the Krm (No at the step S107). On the other hand, when the Krm is equal to or more than the Krm_stk, STKrm is set to be 1 and the processing proceeds to next processing (processing at step S109) (Yes at the step S107, and then the step S108). On this occasion, the Krm may be set to be 0. The STKrm is information showing the existence or the non-existence of the sticking in the roll input system of the main pilot control lever 10A. When the STKrm is set to be 1, the STKrm shows the occurrence of the sticking in the roll input system of the main pilot control lever 10A, and when set to be 0, the STKrm shows the non-existence of the sticking. When the STKrm is set to be 1, the sticking determination portion 31 outputs the information showing the occurrence of the sticking in the roll input system of the main pilot control lever 10A as the determination result J1 to the output unit 33. Based on this, the display 130 displays to be visible that the roll input system of the main pilot control lever 10A is stuck.

In processing at the step S109, the sticking determination portion 31 determines whether or not the magnitude of the Src (the absolute value of the Src) is larger than a predetermined reference value Fxc. The Fxc is the reference value used for determining a magnitude of an operating force applied to the co-pilot control lever 10B. When the absolute value of the Src is equal to or less than the Fxc, that is, a force larger than the Fxc is not applied to the co-pilot control lever 10B, the sticking determination portion 31 sets Krc of a counter value to be 0 (No at the step S109, and then the step S110). Here, the Krc is the counter value used for determining the sticking in the roll input system on the co-pilot control lever 10B side. As mentioned in a following description, the Krc is a barometer showing a possibility of the sticking, and when the magnitude of the Krc is large, the possibility of the sticking can be determined to be high. In addition, when the Krc is equal to or more than Krc_stk of a reference value, the sticking determination portion 31 determines that the sticking has occurred in the roll input system on the co-pilot control lever 10B side.

In the processing at step S109, when the absolute value of the Src is larger than the Fxc, the sticking determination portion 31 determines whether or not a magnitude of a difference between the Src and the Srk (an absolute value of (Src−Srk)) is smaller than Fsc of a predetermined reference value (step S111). The Fsc is the reference value used for determining whether or not an operating force applied to the co-pilot control lever 10B is transmitted to the link mechanisms 120B and 120A. When the absolute value of (Src−Src) is smaller than the Fsc, the sticking determination portion 31 sets the Krc of a counter value to be 0 (Yes at the step S111, and then the step S110). That is, when a force (a lost amount), which is lost from a force applied to the wheel 11B during being transmitted to the link mechanism 120B, is smaller than the reference value, the possibility of the sticking is determined to be low. On the other hand, when the absolute value of (Src−Src) is equal to or more than the Fsc, the sticking determination portion 31 adds 1 to the Krc of the counter value (No at the step S111, and then the step S112). That is, when a difference (a lost amount of force) between the force applied to the wheel 11B and the force transmitted through the link mechanism 120B is equal to or more than the predetermined reference value, the possibility of the sticking is determined to be high. As described above, in the processing at the step S111, the magnitude of the force, which is transmitted to the link mechanism 120B of the operating force Src in the roll direction applied to the co-pilot control lever 10B, is verified.

At the step S112, upon incrementing the Krc of the counter value, the sticking determination portion 31 determines whether or not the Krc is equal to or more than the Krc_stk of the reference value (step S113). The Krc_stk is the reference value used for determining the sticking. When the Krc is smaller than the Krc_stk, the processing proceeds to next processing (processing at the step S101) with keeping the value of the Krc (No at the step S113). On the other hand, when the Krc is equal to or more than the Krc_stk, STKrc is set to be 1 and the processing proceeds to next processing (Yes at the step S113, and then the step S114). On this occasion, the Krc may be set to be 0. The STKrc is information showing the existence or the non-existence of the sticking in the roll input system of the co-pilot control lever 10B. When the STKrc is set to be 1, the STKrc shows the occurrence of the sticking in the roll input system of the co-pilot control lever 10B, and when the STKrc is set to be 0, the STKrc shows the non-existence of the sticking. When the STKrc is set to be 1, the sticking determination portion 31 outputs the information showing the occurrence of the sticking in the roll input system of the co-pilot control lever 10B as the determination result J1 to the output unit 33. Based on this, the display 130 displays to be visible that the roll input system of the co-pilot control lever 10B is stuck.

The order of the processing from the steps S103 to S108 and from the steps S109 to S114 is not limited to the above mentioned order, and these steps may be executed reversely or simultaneously.

When the operating force Srm applied to the control lever 10A is equal to or less than the predetermined value Fxm (No at the step S103), or when the difference between the force Srk transmitted through the link mechanism 120A and the operating force Srm is smaller than the Fsm (Yes at the step S105), the Krm is reset to be 0. For this reason, even when the Krm meets the determining condition of the sticking and is incremented, the Krm is reset to be 0 in the case of not satisfying the determining conditions. That is, only in a case where the Srm and the Srk taken into the sticking determination portion 31 continuously meet the above mentioned determining conditions for a predetermined period, the Krm is equal to or more than the predetermined value Krm_stk, and thus the case is determined to be the sticking. On the other hand, even a case in a non-stuck state sometimes satisfies the above mentioned determining conditions accidentally. However, since such case rarely satisfies the determining conditions continuously for the predetermined period, the Krm is reset to be 0 before the Krm reaches to the Krm_stk, and thus the case is not determined to be the sticking. As described above, according to the present invention, an erroneous decision of the sticking can be avoided. Moreover, these things are the same as those for the input Src and a pitch input for the control lever 10B.

In addition, it is preferred that the F0, Fxm, Fxc, Fsm, Fsc, Krm_stk, and Krc_stk are set on the basis of a characteristic of the system, a characteristic of the fuselage, an environment of the flight control, and the like. For example, in a case where a friction between the control lever 10 and the separation unit 100 is estimated to be large, it is preferred to set large values to the Fxm, Fxc, Fsm, Fsc, Krm_stk, and Krc_stk.

The sticking determination of the pitch input system is executed just as the aforementioned sticking determination processing. As described above, the sticking determination portion 31 can obtain the sticking determination results STKrm and STKrc in the input system in the roll direction and the sticking determination results STKpm and STKpc in the pitch direction as determination results of the determination of the sticking. The sticking determination portion 31 specifies the existence or the non-existence of the sticking and specifies a stuck portion on the basis of the STKrm, STKrc, STKpm, and STKpc, and outputs the determination results J1, J2, and J3.

The sticking determination portion 31 outputs the existence or the non-existence of the sticking and the stuck portion which are specified on the basis of the STKrm, STKrc, STKpm, and STKpc to the output unit 33 as the determination result J1. For example, in a case where the STKrm is 1 and the respective STKrc, STKpm, and STKpc are 0, the determination result J1 showing the sticking of the roll input system in the main pilot control lever 10A is outputted. Alternatively, the sticking determination portion 31 may output the STKrm, STKrc, STKpm, and STKpc as the determination result J1 to the output unit 33, and the output unit 33 may output the display signal OUT for displaying the sticking determination result on the basis of the STKrm, STKrc, STKpm, and STKpc. The display 130 displays the existence or the non-existence of the sticking and a sticking occurrence portion when the sticking occurs. This enables the pilot to confirm the displayed stuck portion.

Furthermore, the sticking determination portion 31 may output the determination result J1, to the output unit 33, including values of the Krm and Krc showing a possibility of the sticking in the roll input system and of the Kpm and Kpc showing a possibility of the sticking in the pitch input system. On this occasion, the output unit 33 outputs the display signal OUT for displaying a level of the possibility of the sticking depending on the values of the Krm, Krc, Kpm, and Kpc to the display 130. According to this, the display 130 can timely display information showing the level of the possibility of the sticking. The pilot can specify the control lever 10 with increasing possibility of the sticking by confirming the displayed level of the possibility of the sticking and can predict the occurrence of the sticking. By predicting the occurrence of the sticking, a handling operation for avoiding the sticking, for example, changing the control lever 10 to be used, can be executed before the occurrence of the sticking. In addition, if the Kpm and Kpc are displayed separately from the Krm and Krc, respectively, a portion likely to be stuck can be specified (it can be confirmed, for example, that there is a possibility of the sticking on the wheel on the co-pilot side).

Figure 6:
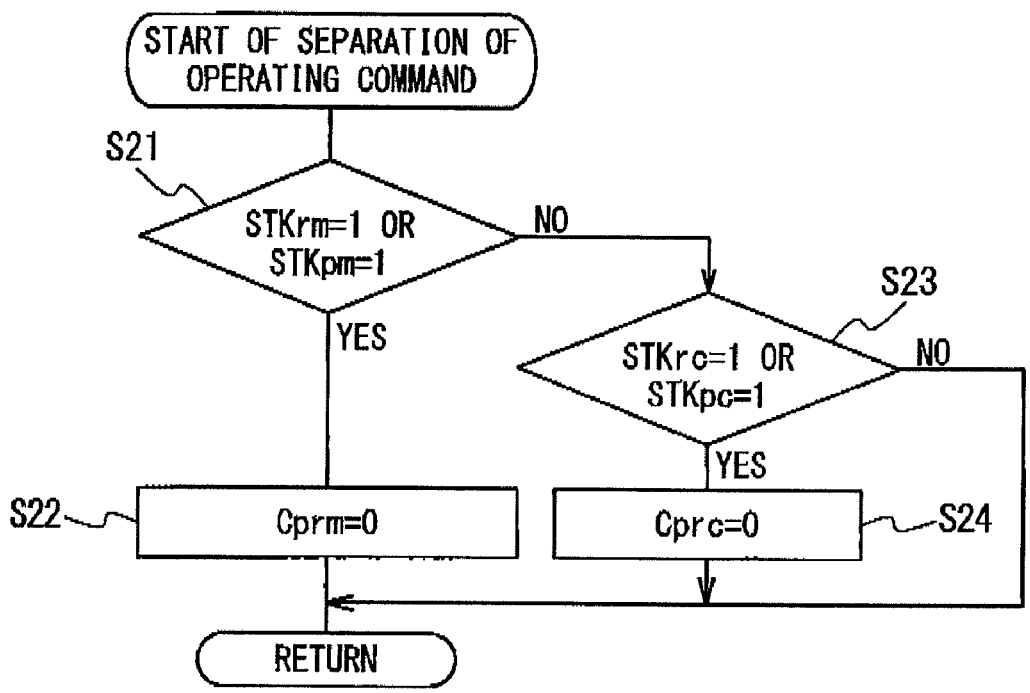
FIG. 6 is a flowchart showing an operation of an operating command separation processing of according to the present invention.

FIG. 6 is a flowchart showing details of the separation processing of the operating command at the step S2. The sticking determination portion 31 outputs, to the control law calculation portion 32, the sticking determination result J2 obtained in the processing at the step S1 and based on the sticking determination results STKrm and STKrc in the input system in the roll direction and based on the sticking determination results STKpm and STKpc in the input system in the pitch direction.

As shown in FIG. 6, the sticking determination portion 31 confirms the values of the STKrm and the STKpm at predetermined timing (step S21). Here, when either one of the STKrm and the STKpm is 1, the sticking determination portion 31 outputs the determination result J2 (Cprm=0) for setting the value of the operating command Cprm to be 0 to the control law calculation portion 32 (Yes at the step S21, and then the step S22). In this case, the control law calculation portion 32 sets the operating command Cprm to be 0 on the basis of the determination result J2 to prohibit a control of the control surfaces by the main pilot control lever 10A. On the other hand, both of the STKrm and STKpm are 0, the sticking determination portion 31 confirms the values of the STKrc and the STKpc (No at the step S21, and then the step S23). In the processing at step S23, when either one of the STKrc and the STKpc is 1, the sticking determination portion 31 outputs the determination result J2 (Cprc=0) to set the value of the operating command Cprc to be 0 to the control law calculation portion 32 (Yes at the step S23, and then the step S24). In this case, the control law calculation portion 32 sets the operating command Cprc to be 0 on the basis of the determination result J2 to prohibit a control of the control surfaces by the co-pilot control lever 10B. On the other hand, when all the values of the STKrm, STKpm, STKrc, and STKpc are 0, the processing proceeds to step S21. In this case, the control law calculation portion 32 carries out, as usual, an operating control by using the inputted operating command Cprm and the operating command Cprc.

As described above, according to the present invention, when the sticking is detected by the sticking determination portion 31, it can be prohibited to use the operating command Cpk from the control lever in which the sticking occurs. For this reason, after the sticking occurs, the pilot is not required to perform the operating by the other control lever, such as overriding the operating command Cpk from the stuck control lever, and it is possible to secure a characteristic of the flight control same as that before the occurrence of the sticking.

Figure 7:
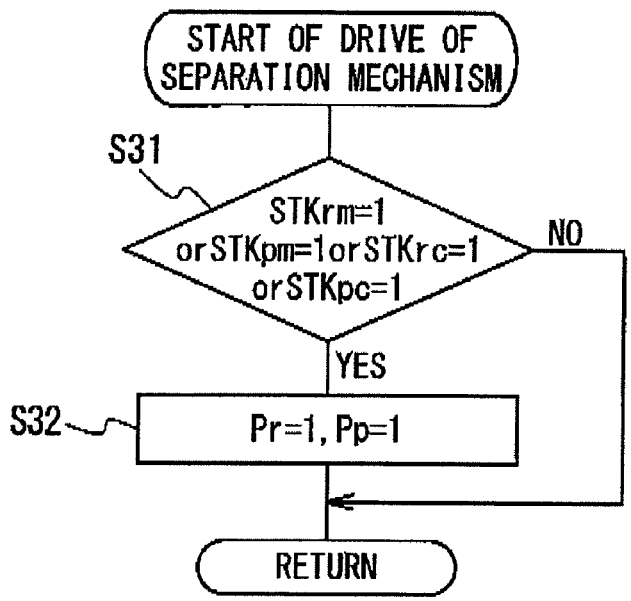
FIG. 7 is a flowchart showing an operation of a drive processing of a separation mechanism according to the present invention.

FIG. 7 is a flowchart showing details of the drive processing of the separation mechanism at the step S3. The sticking determination portion 31 outputs, to the PWR. DRVR, the sticking determination result J3 obtained in the processing at step S1 and based on the sticking determination results STKrm and STKrc in the input system in the roll direction and based on the sticking determination results STKpm and STKpc in the input system in the pitch direction.

As shown in FIG. 7, the sticking determination portion 31 confirms the values of the STKrm, STKpm, STKrc, and STKpc at a predetermined timing (step S31). Here, when either one of the STKrm, STKpm, STKrc, and STKpc is 1, the sticking determination portion 31 outputs "Pr=1, Pp=1" as the determination result J3 (Yes at the step S31, and then the step S32). In this case, the PWR. DRVR generates the separation command Ck for separating the link mechanism 120A from the link mechanism 120B on the basis of the determination result J (Pr=1 and Pp=1) and outputs the generated command to the separation mechanism 103. The separation mechanism 103 cuts connections of the roll input system and the pitch input system in the link mechanisms 120A and 120B on the basis of this separation command Ck. On the other hand, in the processing at the step S31, when all of the STKrm, STKpm, STKrc, and STKpc are 0, the processing proceeds to the step S31 without disconnecting the link mechanisms. Meanwhile, the Pr and Pp outputted as the determination result may be integrated as one signal.

As described above, according to the present invention, when the sticking is detected in the sticking determination portion 31, the link mechanisms connecting the control levers 10 each other can be disconnected. For this reason, a resistance force is not applied from the stuck control lever 10 during operating the control lever 10. In addition, the pilot can continue a smooth flight. Meanwhile, after the sticking determination and the separation of the link mechanisms between the control levers, further sticking determination may be unnecessarily required to be carried out.

Second Embodiment

Figure 8:
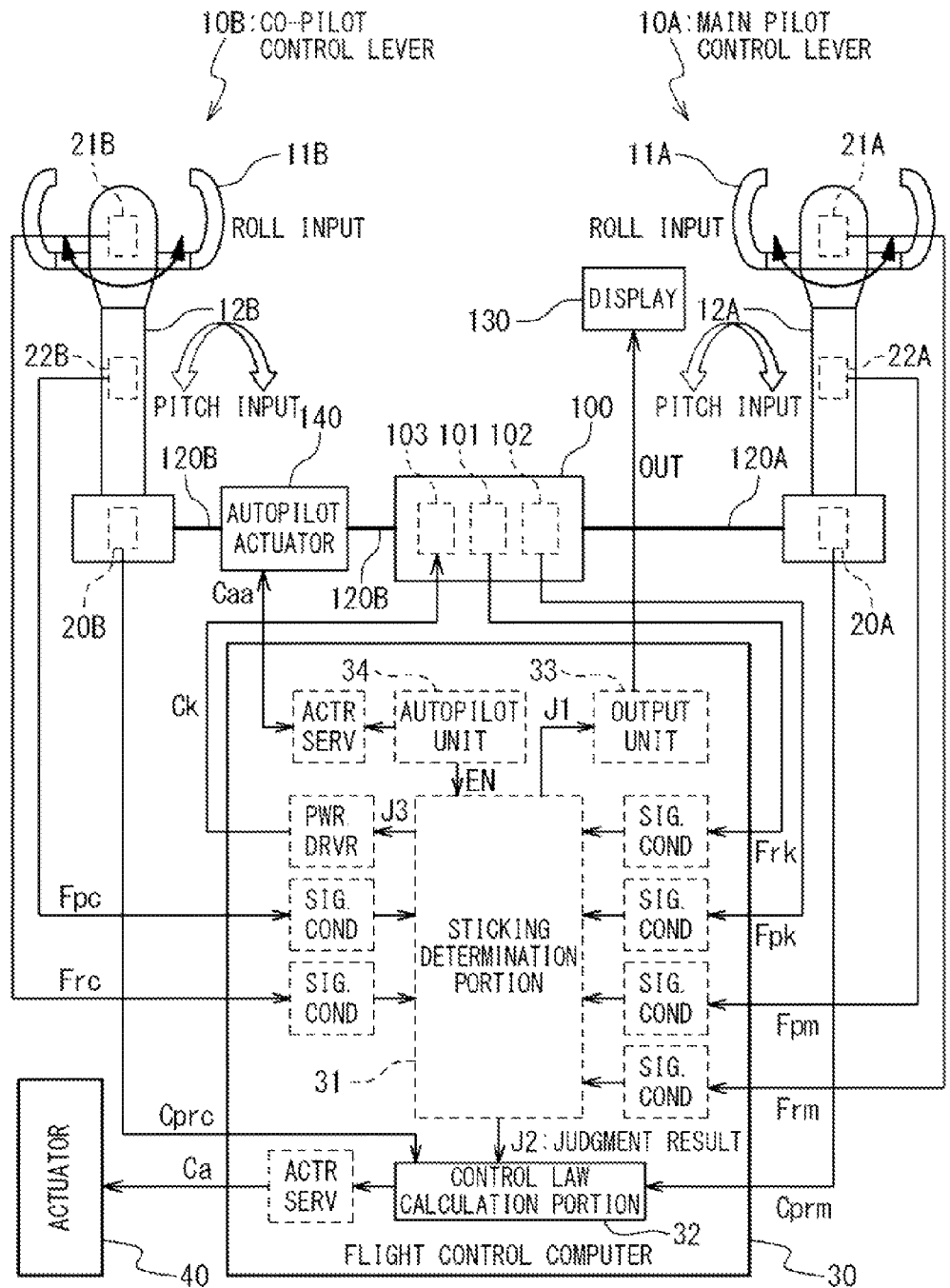
FIG. 8 is a view showing a configuration of a flight control system in a second embodiment according to the present invention.
Figure 9:
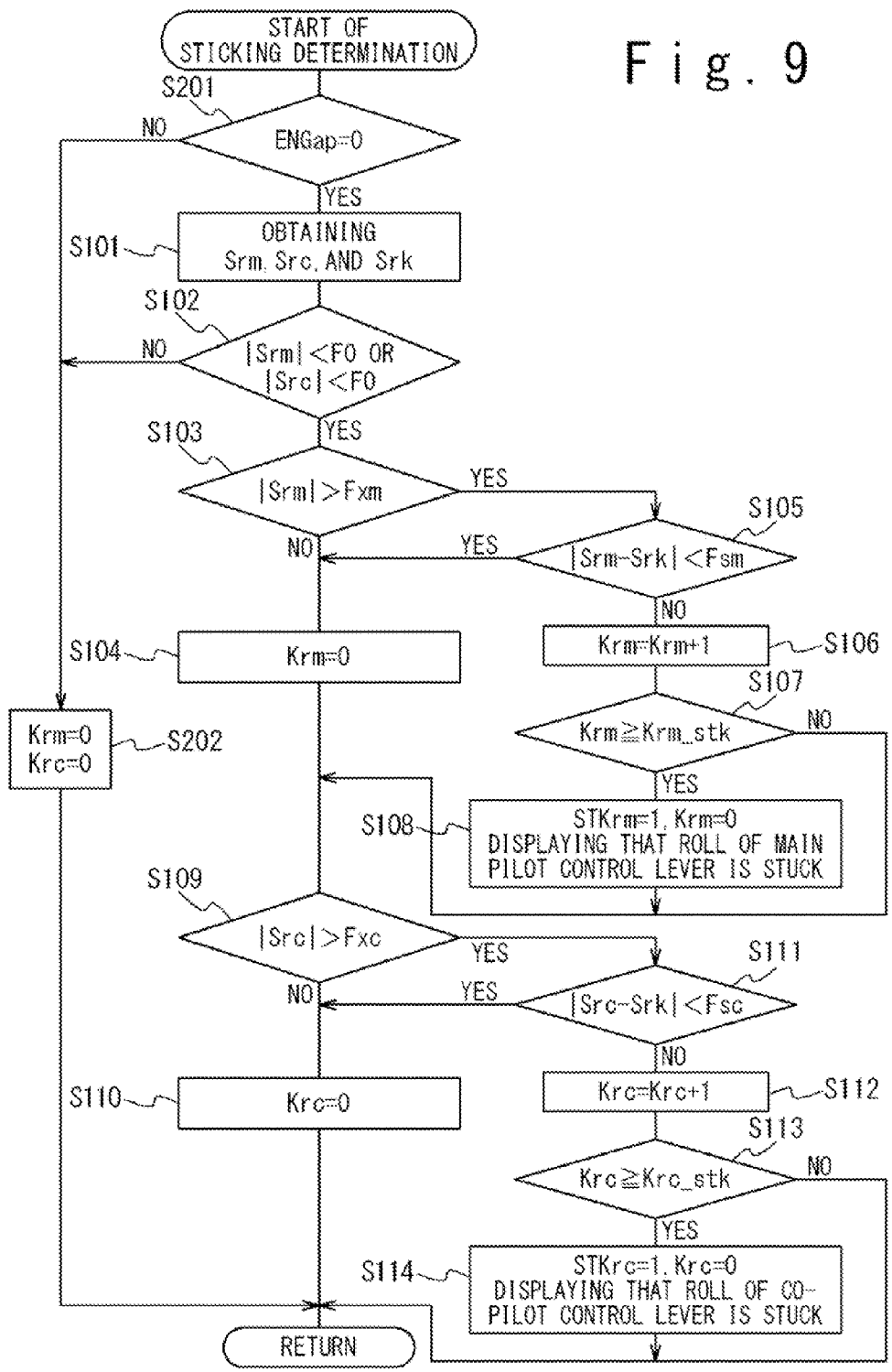
FIG. 9 is a flowchart showing an operation of a sticking determination processing in the second embodiment according to the present invention.

Referring to FIGS. 8 and 9, a second embodiment of the flight system according to the present invention will be explained. The flight control system in the second embodiment is configured by adding an autopilot function to the flight control system in the first embodiment. In a following description, only components and operations different from those of the first embodiment will be explained, and explanations of the same components and operations as those of the first embodiment are omitted.

As shown in FIG. 8, the flight control computer 30 according to the second embodiment includes an autopilot unit 34 for realizing an autopilot function. In addition, the flight control system according to the second embodiment is provided with an autopilot actuator 140 connected to either one of the link mechanisms 120A and 120B. In an example shown in FIG. 8, the autopilot actuator 140 is connected to the link mechanism 120B on the co-pilot control lever 10B side. The autopilot unit 34 outputs, in an autopilot mode, an autopilot actuator control signal Caa on the basis of the fuselage motion data and air data from the sensor 70, preliminarily programmed flight-path information, and the like. The autopilot actuator 140 automatically flies the aircraft on the basis of the autopilot actuator control signal Caa. Specifically, the autopilot actuator 140 operates the control lever 10 via the link mechanisms 120B and 120A on the basis of the autopilot actuator control signal Caa. That is, in the autopilot mode, an operating control is carried out by the autopilot actuator 140 operating the control lever 10 in place of a pilot. On this occasion, a force applied to the control lever 10B by the autopilot actuator 140 is detected by the roll sensor 21B and the pitch sensor 22B, and displacements of the control lever 10B are detected by the steering sensor 20B.

In addition, in the autopilot mode, the autopilot unit 34 outputs an engage signal EN to the sticking determination portion 31. The sticking determination portion 31 can confirm a state of flying in the autopilot mode on the basis of the engage signal EN. The autopilot unit 34 can be realized by programs executed by a processing device. In addition, the autopilot unit 34, depending on a type, may be realized by a device other than the flight control computer 30. In this case, the sticking determination portion 31 is informed of the autopilot mode when the engage signal EN is taken from the device into the flight control computer 30.

FIG. 9 is a flowchart showing the sticking determining operation at the step S1 in the second embodiment. Referring to FIG. 9, details of the sticking determining operation in the second embodiment will be explained. In the following description, the sticking determining operation will be explained taking the sticking determination to the roll input as an example, however, the sticking determination to the pitch input is the same as that to the roll input and the explanation thereof is omitted.

The sticking determination portion 31 in the second embodiment sets a parameter ENGap to be 0 in a normal mode, and sets the parameter ENGap to be a predetermined value, for example, 1 when an engage signal EN is inputted. In the sticking determination processing in the second embodiment, a confirmation processing of the parameter ENGap is executed at a predetermined timing before the above described step S101 (step S201). In the step S201, in a case where the ENGap is set to the predetermined value, for example, 1, that is, in a case of the autopilot mode, the Krm and Krc are set to be 0 and the processing proceeds to the next processing (No at the step S201, and then the step S202). In a case where the ENGap is set to be 0 in the step S201, that is, in a case of the normal mode, the processing proceeds to the step S101 in the same manner as the first embodiment and the sticking determination processing is executed (Yes at the step S201).

During the autopilot mode, there is a case where the pilot operates the control lever and the operating force overrides the autopilot actuator 140. However, since the flight control computer 30 in the present embodiment does not carry out the sticking determination in the autopilot mode, it is possible to enable the flight control computer 30 not to determine the operation overriding the autopilot actuator 140 to be the sticking.

Third Embodiment

Figure 10:
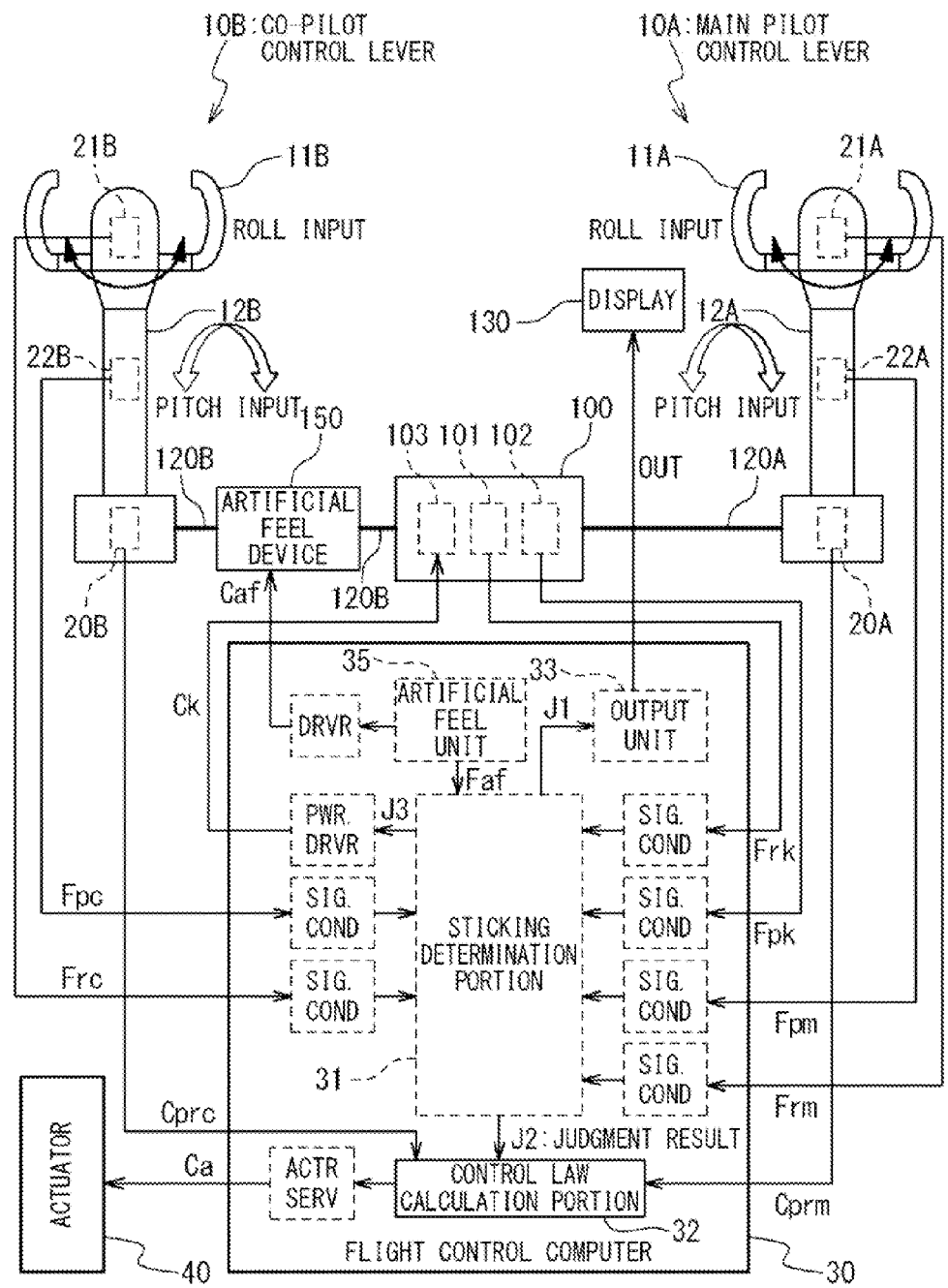
FIG. 10 is a view showing a configuration of a flight control system in a third embodiment according to the present invention.
Figure 11:
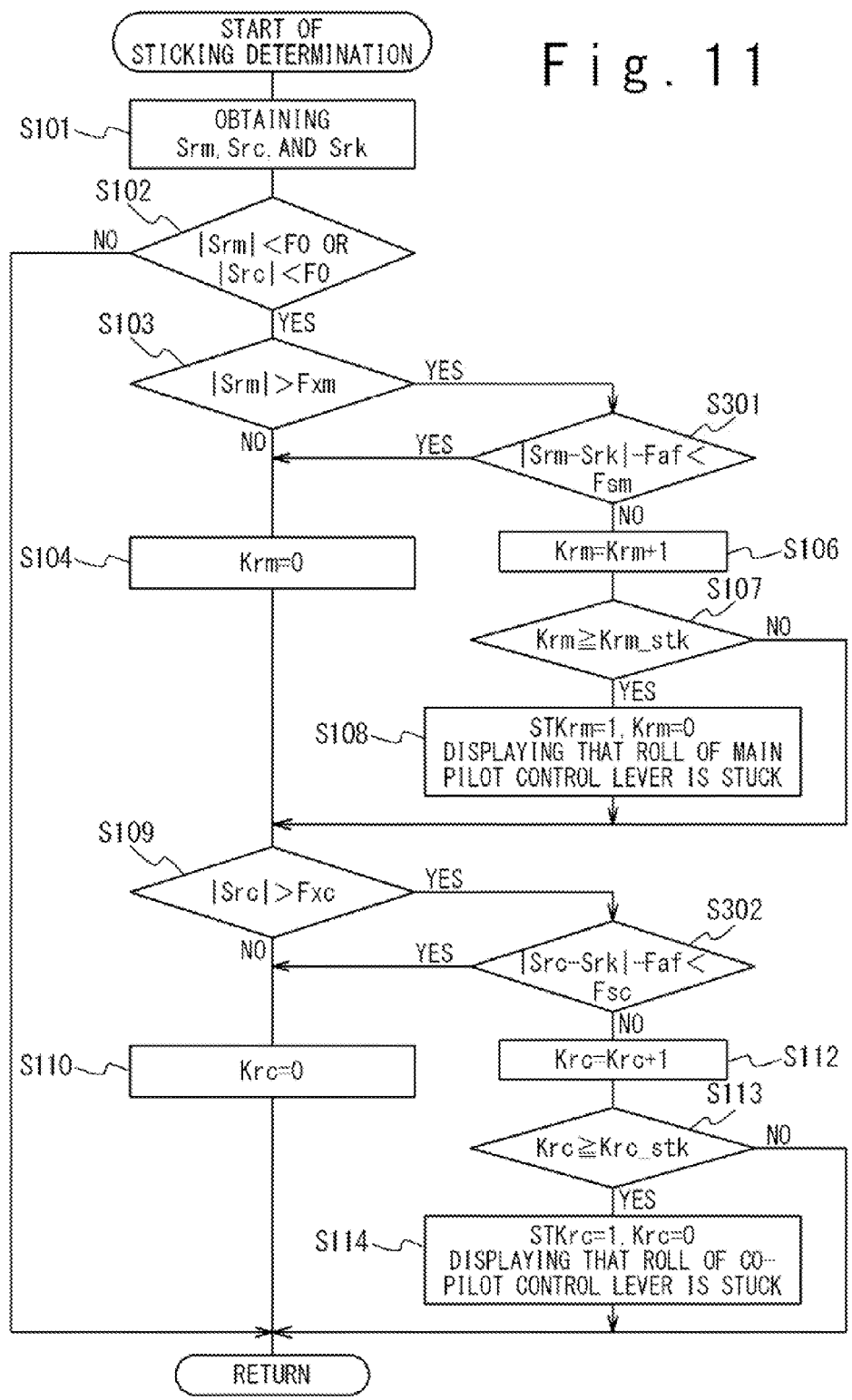
FIG. 11 is a flowchart showing an operation of a sticking determination processing in the third embodiment according to the present invention.

Referring to FIGS. 10 and 11, the flight control system in a third embodiment according to the present invention will be explained. The flight control system in the third embodiment is configured by adding an artificial feel function to the flight control system in the first embodiment. In a following description, only components and operations different from those of the first embodiment will be explained, and explanations of the same components and operations as those of the first embodiment are omitted.

As shown in FIG. 10, the flight control computer 30 in the third embodiment includes an artificial feel unit 35 for generating a reaction force based on the flight condition of the fuselage 60. In addition, the flight control system in the third embodiment is provided with an artificial feel device 150 connected to either one of the link mechanisms 120A and 120B. In an example shown in FIG. 10, the artificial feel device 150 is connected to the link mechanism 120B on the co-pilot control lever 10B side. The artificial feel unit 35 outputs an artificial feel device control signal Caf generated depending on the fuselage motion data and air data from the sensor 70, a preliminarily set artificial feel scheduling, and the like to control the artificial feel device 150. The artificial feel device 150 applies the reaction force based on the artificial feel device control signal Caf to the control lever 10 via the link mechanisms 120B and 120A.

FIG. 11 is a flowchart showing the sticking determining operation at the step S1 in the third embodiment. Referring to FIG. 11, details of the sticking determining operation in the present embodiment will be explained. In the following description, the sticking determining operation will be explained taking the sticking determination to the roll input as an example, however, the sticking determination to the pitch input is the same as that to the roll input and the explanation thereof is omitted.

In the sticking determination processing in the present embodiment, the sticking is determined on the basis of a force obtained by subtracting Faf, the reaction force of the artificial feel device, from a difference between the steering force Srm to the control lever 10 and the force Srk detected in the separation unit 100. That is, the sticking determination processing in the third embodiment includes steps S301 and S302 in place of the steps S105 and S111 of the sticking determination processing in the first embodiment.

Specifically, when the absolute value of the Srm is larger than the Fxm in the processing at the step S103, the sticking determination portion 31 determines whether or not a value obtained by subtracting a value of the reaction force Faf from a value of a difference between the Srm and the Srk (the absolute value of (Srm-Srk)) is smaller than the Fsm (step S301). Here, when the value obtained by subtracting the Faf from the absolute value of (Srm-Srk) is smaller than the Fsm, the sticking determination portion 31 sets the Krm of a counter value to be 0 (Yes at the step S301, and then the step S104). When the value obtained by subtracting the Faf from the absolute value of (Srm-Srk) is equal to or more than the Fsm, the sticking determination portion 31 adds 1 to the Krm of the counter value (No at the step S301, and then the step S106). In the same manner, in the processing at the step S109, when the absolute value of the Src is larger than the Fxc, the sticking determination portion 31 determines whether a value obtained by subtracting a value of the reaction force Faf from a value of a difference between the Src and the Srk (the absolute value of "Src−Srk") is smaller than the Fsc or not (step S302). Here, when the value obtained by subtracting the Faf from the absolute value of (Src−Srk) is smaller than the Fsc, the sticking determination portion 31 sets the Krc of the counter value to be 0 (Yes at the step S302, and then the step S110). When the value obtained by subtracting the Faf from the absolute value of (Src−Srk) is equal to or more than the Fsc, the sticking determination portion 31 adds 1 to the Krc of the counter value (No at the step S302, and then the step S112).

As described above, the flight system in the third embodiment can carry out the sticking determination with considering the reaction force in the artificial feel device. In addition, the above mentioned sticking determination method is effective for a case where a variable artificial feel device is provided. In a flight control system provided with an artificial feel device having a fixed reaction force, it is preferred that the sticking determination is carried out on the basis of the Fsm and Fsc set with considering the reaction force in the method shown in the first embodiment.

Fourth Embodiment

Figure 12:
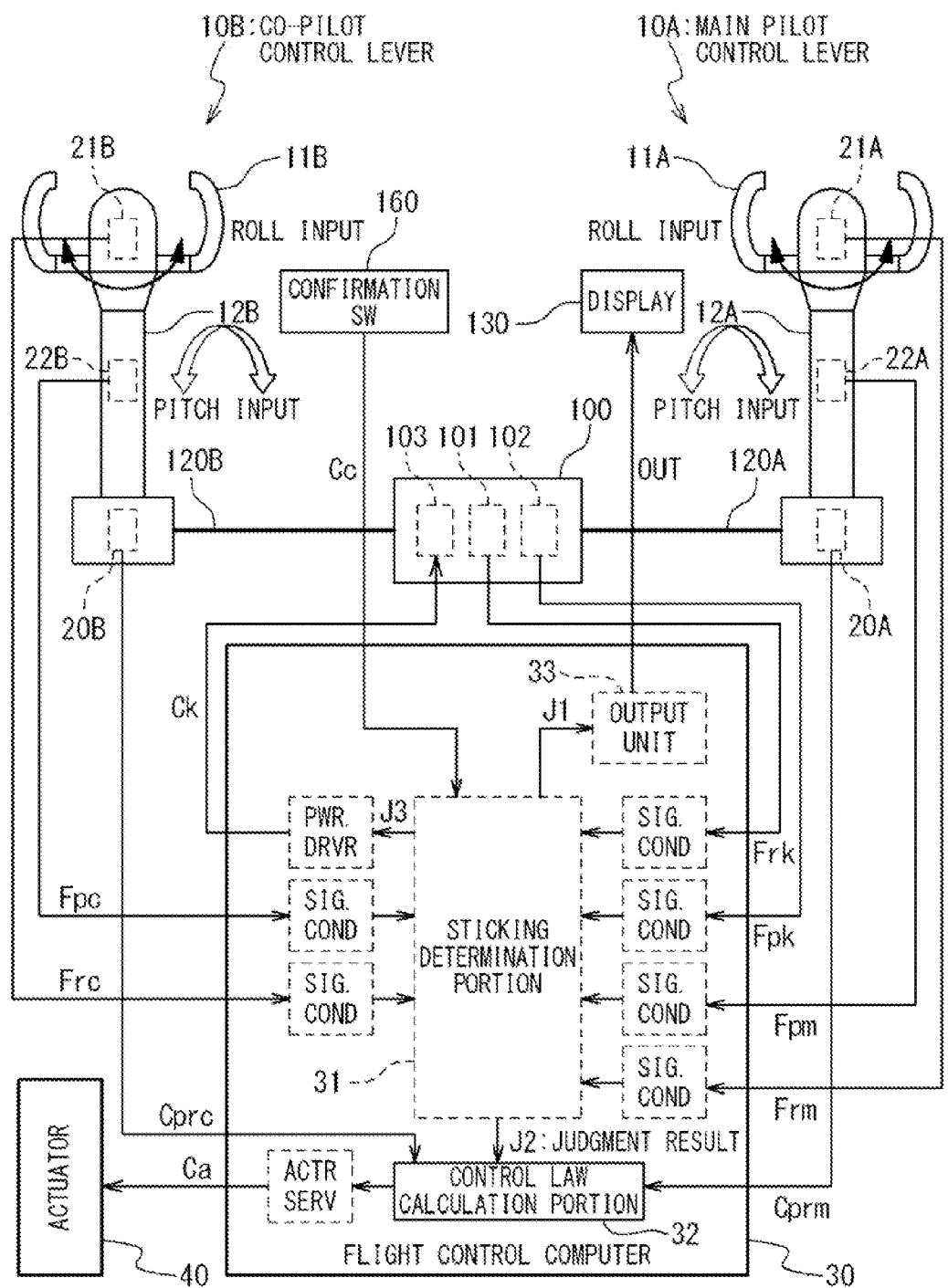
FIG. 12 is a view showing a configuration of a flight control system in a fourth embodiment according to the present invention.
Figure 13A:
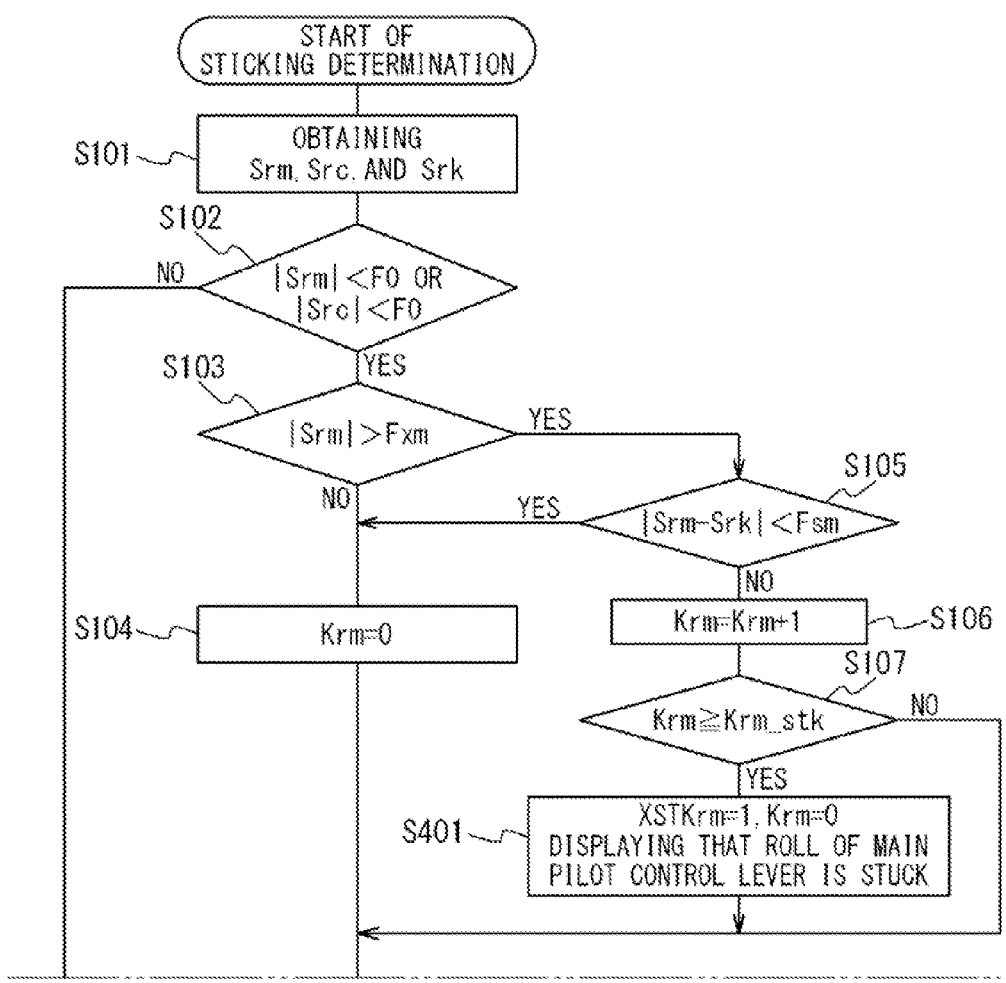
FIG. 13A is a flowchart showing an operation of a sticking determination processing in the fourth embodiment according to the present invention.
Figure 13B:
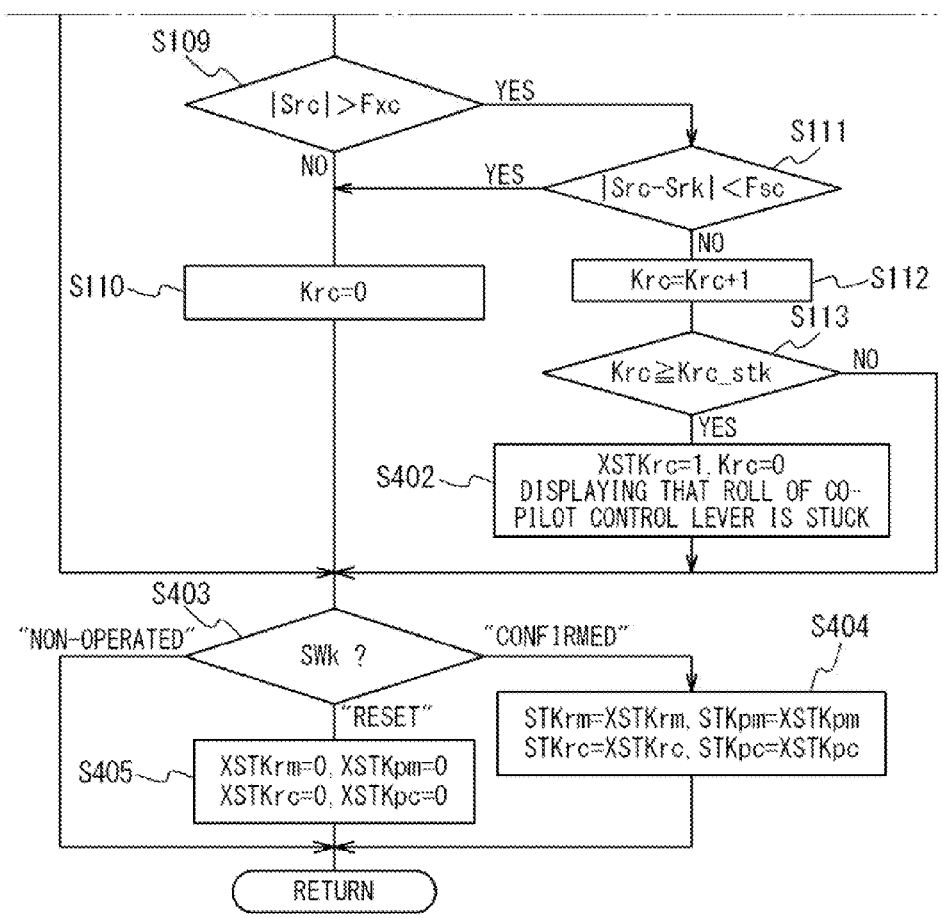
FIG. 13B is a flowchart showing the operation of the sticking determination processing in the fourth embodiment according to the present invention.

Referring to FIGS. 12, 13A, and 13B, the flight control system in a fourth embodiment of according to the present invention will be described. The flight control system in the fourth embodiment is configured by adding a sticking confirming function to the flight control system in the first embodiment. In the following description, only components and operations different from those of the first embodiment will be explained, and the explanations of the same components and operations as those of the first embodiment are omitted.

As shown in FIG. 12, the flight control system in the fourth embodiment includes a confirmation switch (a confirmation SW) 160. The pilot confirms the sticking determination result displayed on the display 130, and executes the separation of the link mechanism by operating the confirmation SW 160 when the sticking occurs. Even when detecting the sticking, the sticking determination portion 31 in the fourth embodiment does not carry out the separation control of the link mechanism until a confirmation command Cc for ordering the separation is inputted from the confirmation SW 160.

FIGS. 13A and 13B are flowcharts showing the sticking determining operation at the step S1 in the fourth embodiment. Referring to FIGS. 13A and 13B, details of the sticking determining operation in the present embodiment will be explained. In the following description, the sticking determining operation will be explained taking the sticking determination to the roll input as an example, however, the sticking determination to the pitch input is the same as that to the roll input and the explanation thereof is omitted.

In the sticking determination processing in the fourth embodiment, the step S401 is included in place of the step S108 in the first embodiment and the step S402 is included in place of the step S114, and a confirmation processing (steps S403 to S405) based on the confirmation signal Cc is further added.

Specifically, when the Krm is equal to or more than the Krm_stk in the processing at the step S107, the sticking determination portion 31 sets XSTKrm to be 1 and resets the Krm (step S401). The XSTKrm is a sticking determination flag before the confirmation of the roll input system on the main pilot side. For example, the XSTKrm is set to be 0 as an initial value (non-stuck), and shows the sticking when set to be 1. When the XSTKrm is set to be 1, the sticking determination portion 31 outputs information showing the occurrence of the sticking in the roll input system of the main pilot control lever 10A to the output unit 33 as the determination result J1. According to this, the display 130 displays to be visible that the roll input system of the main pilot control lever 10A is stuck. In the same manner, when the Krc is equal to or more than the Krc_stk in the processing at the step S113, the sticking determination portion 31 sets the XSTKrc to be 1 and resets the Krc (step S402). Similarly, XSTKpm shows the sticking determination flag before the confirmation of the pitch input system on the main pilot side, XSTKrc shows the sticking determination flag before the confirmation of the roll input system on the co-pilot side, and XSTKpc shows the sticking determination flag before the confirmation of the pitch input system on the co-pilot side. When the XSTKrm is set to be 1, the sticking determination portion 31 outputs information showing the occurrence of the sticking in the roll input system of the main pilot control lever 10A to the output unit 33 as the determination result J1. According to this, the display 130 displays to be visible that the roll input system of the main pilot control lever 10A is stuck.

In a case of No at the step S102, in a case where the processing at the step S110 is completed, in a case of No at the step S113, and in a case where the processing at the step S402 is completed, the sticking determination portion 31 confirms a value set to parameter SWk (step S403). Here, the SWk is a parameter whose value is set by the confirmation signal Cc. The SWk is set to "Confirmed" on the basis of the confirmation signal Cc showing the confirmation, the SWk is set to "Reset" on the basis of the confirmation signal Cc showing the reset, and the SWk is set to "Non-operated" on the basis of the confirmation signal Cc showing the non-operation. When the SWk is set to the "Confirmed", the sticking determination portion 31 sets the XSTKrm, XSTKpm, XSTKrc, and XSTKpc to the STKrm, STKpm, STKrc, and STKpc, respectively (step S404). On this occasion, the sticking determination portion 31 may output a signal for deleting the display indicating the sticking to the display 130 via the output unit 33. When the SWk is set to the "Reset", the sticking determination portion 31 sets all of the XSTKrm, XSTKpm, XSTKrc, and XSTKpc to be 0 (step S405). On this occasion, the sticking determination portion 31 may output the signal for deleting the display indicating the sticking to the display 130 via the output unit 33. When the SWk is set to the "Non-operated" at the step S403, the processing proceeds to next processing without any operation.

As described above, according to the flight control system in the fourth embodiment, the separation of the link mechanism between the control levers can be carried out after the sticking is confirmed by the pilot. For this reason, the separation at a timing not intended by the pilot can be avoided. In addition, since the separation of the link mechanism is carried out on the basis of the pilot operation, the separation caused by an erroneous decision of the flight control computer 30 can be avoided.

Fifth Embodiment

Figure 14:
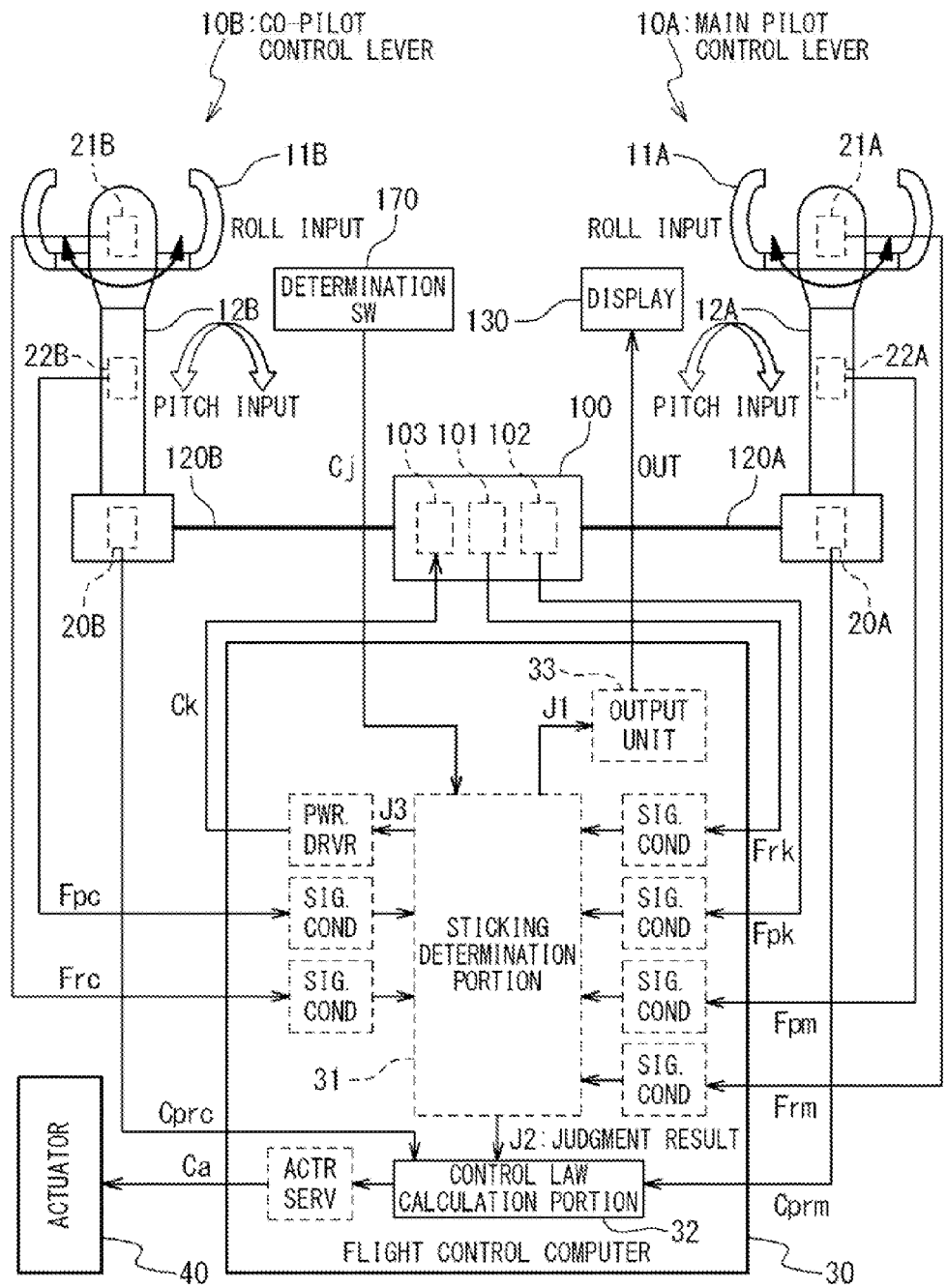
FIG. 14 is a view showing a configuration of a flight control system in a fifth embodiment according to the present invention.

Referring to FIGS. 14 and 15, the flight control system in a fifth embodiment of according to the present invention will be described. The flight control system in the fifth embodiment is configured by adding a determination ordering function to the flight control system in the first embodiment. In the following description, only components and operations different from those of the first embodiment will be explained, and the explanations of the same components and operations as those of the first embodiment are omitted.

As shown in FIG. 14, the flight control system in the fifth embodiment includes a determination switch (a determination SW) 170. When desiring to confirm the sticking, the pilot can order the flight control computer 30 to carry out the sticking determination by operating the determination SW 170. The sticking determination portion 31 in the fifth embodiment carries out the sticking processing on the basis of a determination signal Cj from the determination SW 170.

FIG. 15 is a flowchart showing the sticking determining operation at the step S1 the fifth embodiment. Referring to FIG. 15, details of the sticking determining operation in the present embodiment will be explained. In the following description, the sticking determining operation will be explained taking the sticking determination to the roll input as an example, however, the sticking determination to the pitch input is the same as that to the roll input and the explanation thereof is omitted.

In the sticking determination processing in the fifth embodiment, the confirmation processing of SWjdg is executed at predetermined timing before the step S101 in the first embodiment (step S501). The SWjdg is a determination ordering flag set to be "1 (Determine)" or "0 (Reset)" depending on the inputted determination signal Cj. When the SWjdg is not set to be the "Determine", for example, when set to be the "0", the sticking determination portion 31 sets the Krm and Krc to be 0 (step S502), and the processing proceeds to next processing (No at the step S501). On the other hand, when the SWjdg is set to be the "Determine" at the step S501, the processing shifts to the step S101 and executes the sticking determination processing in the same manner as the first embodiment (Yes at the step S501).

As described above, since carrying out the sticking determination on the basis of the operation of the confirmation SW 170 by the pilot, the flight control system in the fifth embodiment does not constantly execute the sticking determination processing. Since the pilot can carry out a determination of malfunction only in a determination mode by operating the determination switch when the pilot determines that there is the possibility of the sticking, the separation at the timing not intended by the pilot can be avoided and also the separation caused by an erroneous sticking decision can be avoided. In addition, a processing load of the flight control computer can be reduced.

The embodiments of the present invention has been described above, however, their concrete configurations are not limited to those of the above described embodiments and modified configurations which do not depart from a scope of the invention are also included in the present invention. In addition, the first to the fifth embodiments can be combined within a technical scope free of contradictions.

The invention claimed is:

1. A flight control system comprising:
a first sensor configured to detect a force applied from an outside to a first control lever;
a link mechanism configured to mechanically connect said first control lever to a second control lever different from said first control lever, and transmit a force from said first control lever to said second control lever;
a second sensor configured to detect a force transmitted from said first control lever to said link mechanism;
a flight control computer configured to include a sticking determination portion which determines whether or not sticking arises in said first control lever on the basis of said force detected by said first sensor and said force detected by said second sensor; and
a separation unit configured to disconnect said link mechanism on the basis of a separation command to separate a connection between said first control lever and said second control lever,
wherein said sticking determination portion outputs said separation command to said separation unit when determining that said sticking arises in said first control lever.

2. The flight control system according to claim 1, wherein said sticking determination portion determines that said sticking arises in said first control lever when a difference between said force detected by said first sensor and said force detected by said second sensor is equal to or more than a reference value.

3. The flight control system according to claim 1, wherein said sticking determination portion determines that said sticking arises in said first control lever when number of times of cases, in which a difference between said force detected by said first sensor and said force detected by said second sensor is equal to or more than a reference value, is equal to or more than a predetermined value.

4. The flight control system according to claim 1, wherein said first sensor includes:
a first roll sensor configured to detect a force in a roll direction with respect to said first control lever, and
a first pitch sensor configured to detect a force in a pitch direction with respect to said first control lever,
wherein said second sensor includes:
a second roll sensor configured to detect a force in a roll direction with respect to said first control lever transmitted via said link mechanism, and
a second pitch sensor configured to detect a force in a pitch direction with respect to said first control lever transmitted via said link mechanism,
wherein said sticking determination portion determines that said sticking arises in said first control lever when a difference between said force detected by said first roll sensor and said force detected by said second roll sensor is equal to or more than a first reference value or when a difference between said force detected by said first pitch sensor and said force detected by said second pitch sensor is equal to or more than a second reference value.

5. The flight control system according to claim 1, further comprising:
an artificial feel device configured to apply a reaction force to at least one of said first control lever and said second control lever,
wherein said sticking determination portion determines that said sticking arises in said first control lever when a value obtained by subtracting a value of said reaction force from a value of a difference between said force detected by said first sensor and said force detected by said second sensor is equal to or more than a reference value.

6. The flight control system according to claim 1, wherein said sticking determination portion stops a determination processing of sticking in an autopilot mode.

7. The flight control system according to claim 1, further comprising:
an output device configured to output a sticking determination result of said sticking determination portion in a manner that a pilot can confirm said determination result.

8. The flight control system according to claim 1, further comprising:
a determination switch configured to output a determination signal in response to an operation by a pilot,
wherein said sticking determination portion determines said sticking based on said determination signal.

9. The flight control system according to claim 1, further comprising:
a displacement sensor configured to detect a displacement of said first control lever,
wherein said flight control computer controls control surfaces based on said displacement detected by said displacement sensor, and
wherein said sticking determination portion prohibits said control of said control surfaces based on said displacement detected by said displacement sensor when determining that said staking occurs in said first control lever.

10. The flight control system according to claim 1, further comprising:
a confirmation switch configured to output a confirmation signal in response to an operation of a pilot,
wherein said flight control computer outputs said separation command based on said confirmation signal.

11. A method of separating a control lever linkage, which is a method of separating a link mechanism which mechanically connects a first control lever to a second control lever different from said first control lever and transmits a force from said first control lever to said second control lever, said method comprising:
a first sensor detecting a force applied from an outside to said first control lever;
a second sensor detecting a force transmitted from said first control lever to said link mechanism;
determining whether or not sticking arises in said first control lever on the basis of said force detected by said first sensor and said force detected by said second sensor;
outputting a separation command when determining that said sticking arises in said first control lever in said step of said sticking determination; and
disconnecting said link mechanism on the basis of said separation command to separate a connection between said first control lever and said second control lever.

12. The method of separating a control lever linkage according to claim 11, wherein said step of said sticking determination includes:
calculating a difference between said force detected by said first sensor and said force detected by said second sensor, and
determining that said sticking arises in said first control lever when said difference between said forces is equal to or more than a reference value.

13. The method of separating a control lever linkage according to claim 11, wherein said step of said sticking determination includes:
calculating a difference between said force detected by said first sensor and said force detected by said second sensor,
counting number of times of cases, in which said difference between said forces is equal to or more than a reference value, and
determining that said sticking arises in said first control lever when said number of times of cases is equal to or more than a predetermined value.

14. The method of separating a control lever linkage according to claim 11, wherein said step of said first sensor detecting a force applied from an outside to said first control lever, includes:
a first roll sensor detecting a force in a roll direction with respect to said first control lever, and
a first pitch sensor detecting a force in a pitch direction with respect to said first control lever, wherein said step of said second sensor detecting a force transmitted from said first control lever to said link mechanism, includes:
a second roll sensor detecting a force in a roll direction with respect to said first control lever transmitted via said link mechanism, and
a second pitch sensor detecting a force in a pitch direction with respect to said first control lever transmitted via said link mechanism,
wherein said step of said sticking determination includes:
determining that said sticking arises in said first control lever when a difference between said force detected by said first roll sensor and said force detected by said second roll sensor is equal to or more than a first reference value or when a difference between said force detected by said first pitch sensor and said force detected by said second pitch sensor is equal to or more than a second reference value.

15. The method of separating a control lever linkage according to claim 11, further comprising:
applying a reaction force to at least one of said first control lever and said second control lever,
wherein said step of said sticking determination includes:
calculating a value by subtracting a value of said reaction force from a value of a difference between said force detected by said first sensor and said force detected by said second sensor, and
determining that said sticking arises in said first control lever when said value obtained by subtracting said value of said reaction force from said value of said difference between said forces is equal to or more than a reference value.

16. The method of separating a control lever linkage according to claim 11, further comprising:
stopping a determination processing of sticking in an autopilot mode.

17. The method of separating a control lever linkage according to claim 11, further comprising:
outputting a sticking determination result of said step of said sticking determination in a manner that a pilot can confirm said determination result.

18. The method of separating a control lever linkage according to claim 11, further comprising:
outputting a determination signal in response to an operation by a pilot,
wherein said step of said sticking determination includes:
determining said sticking based on said determination signal.

19. The method of separating a control lever linkage according to claim 11, further comprising;
detecting a displacement of said first control lever; and
controlling control surfaces based on said displacement,
wherein said step of said sticking determination includes:
prohibiting said control of said control surfaces based on said displacement when determining that said staking occurs in said first control lever.

20. The method of separating a control lever linkage according to claim 11, further comprising:
outputting a confirmation signal in response to an operation of a pilot,
wherein said step of said outputting a separation command, includes:
outputting said separation command based on said confirmation signal.

* * * * *